United States Patent
Raszga et al.

(10) Patent No.: US 9,913,437 B2
(45) Date of Patent: *Mar. 13, 2018

(54) VELOCITY-BASED CONTROL OF END EFFECTOR

(71) Applicant: DEERE & COMPANY, Moline, IL (US)

(72) Inventors: Calin Raszga, Asbury, IA (US); Daryl I. Rober, Asbury, IA (US); Todd F. Velde, Dubuque, IA (US)

(73) Assignee: Deere & Company, Moline, IL (US)

( * ) Notice: Subject to any disclaimer, the term of this patent is extended or adjusted under 35 U.S.C. 154(b) by 403 days.

This patent is subject to a terminal disclaimer.

(21) Appl. No.: 14/684,177

(22) Filed: Apr. 10, 2015

(65) Prior Publication Data

US 2016/0295814 A1    Oct. 13, 2016

(51) Int. Cl.
*A01G 23/081* (2006.01)
*A01G 23/00* (2006.01)

(52) U.S. Cl.
CPC ......... *A01G 23/081* (2013.01); *A01G 23/003* (2013.01)

(58) Field of Classification Search
CPC .... A01G 23/081; A01G 23/003; A01G 23/08; A01G 23/091; A01D 46/30; A01D 46/26; B60G 17/0165; E02F 9/26; F15B 13/0401
See application file for complete search history.

(56) References Cited

U.S. PATENT DOCUMENTS

| | | | |
|---|---|---|---|
| 4,252,213 A | 2/1981 | Ekman | |
| 4,445,552 A * | 5/1984 | Hyde | A01G 23/091 144/336 |
| 4,910,673 A | 3/1990 | Narisawa et al. | |
| 5,002,454 A | 3/1991 | Hadank et al. | |
| 5,160,239 A | 11/1992 | Allen et al. | |
| 5,377,730 A * | 1/1995 | Hamilton | A01G 23/081 144/335 |

(Continued)

FOREIGN PATENT DOCUMENTS

| | | |
|---|---|---|
| BR | P10705749 | 6/2008 |
| CA | 2597203 | 2/2008 |

(Continued)

OTHER PUBLICATIONS

U.S. Appl. No. 15/643,008, filed Jul. 2017, Bellows et al.*

(Continued)

*Primary Examiner* — McDieunel Marc
(74) *Attorney, Agent, or Firm* — Lorenz & Kopf, LLP

(57) ABSTRACT

A control system for moving an end effector of a work machine may include sensors for determining current orientations of components of a boom assembly connected to the work machine. A controller may be configured to receive, via an input interface, signals corresponding to a velocity input command for a desired movement of the end effector. The controller may determine, based upon the velocity input command and signals from the sensors, at least one target velocity for one or more actuators for the boom assembly. Commanding the actuators to move with the at least one target velocity may cause the end effector to move with an aggregate velocity corresponding to the desired movement of the end effector, as indicated by the velocity input command.

20 Claims, 13 Drawing Sheets

(56) References Cited

U.S. PATENT DOCUMENTS

| | | | |
|---|---|---|---|
| 5,424,623 A | | 6/1995 | Allen et al. |
| 5,550,757 A | | 8/1996 | Tervahauta |
| 5,655,584 A | * | 8/1997 | Glawson .............. A01G 23/081 144/24.13 |
| 5,961,563 A | | 10/1999 | Overton |
| 6,463,725 B1 | * | 10/2002 | Briesemeister ...... A01D 46/264 56/328.1 |
| 6,553,278 B2 | | 4/2003 | Handroos et al. |
| 7,320,349 B2 | | 1/2008 | Gatz |
| 7,844,379 B2 | | 11/2010 | Tang et al. |
| 8,430,621 B2 | | 4/2013 | Jantti |
| 8,862,340 B2 | | 10/2014 | Andruch et al. |
| 2002/0008075 A1 | | 1/2002 | Handroos et al. |
| 2005/0133115 A1 | * | 6/2005 | Gatz ....................... A01G 23/08 144/357 |
| 2007/0219662 A1 | | 9/2007 | Sawodny et al. |
| 2008/0041805 A1 | | 2/2008 | Jantti |
| 2008/0289724 A1 | * | 11/2008 | Sharplin ................ A01G 23/08 144/336 |
| 2009/0118913 A1 | * | 5/2009 | O'Halloran ........ B60G 17/0165 701/50 |
| 2012/0255649 A1 | | 10/2012 | Raszga et al. |
| 2013/0218424 A1 | | 8/2013 | Jantti |
| 2014/0178166 A1 | | 6/2014 | Caterpillar |
| 2016/0146226 A1 | * | 5/2016 | Goedken ............. F15B 13/0401 60/431 |
| 2016/0219786 A1 | * | 8/2016 | Needham ............... A01D 46/26 |
| 2016/0243696 A1 | * | 8/2016 | Kahani .................. A01D 46/30 |
| 2017/0130429 A1 | * | 5/2017 | Lafrenier .................. E02F 9/26 |

FOREIGN PATENT DOCUMENTS

| | | |
|---|---|---|
| DE | 4231599 | 3/1994 |
| DE | 19808694 | 9/1999 |
| EP | 1174384 | 1/2002 |
| EP | 1889537 | 2/2008 |
| EP | 2116128 | 11/2009 |
| FI | 20001427 | 12/2001 |
| FI | 20001682 | 1/2002 |
| FI | 20065515 | 2/2008 |
| FI | 123932 | 12/2013 |
| JP | 2002128468 | 5/2002 |
| JP | 2004277142 | 10/2004 |
| SE | 528785 | 2/2007 |
| WO | 9317301 | 9/1993 |
| WO | 9426988 | 11/1994 |

OTHER PUBLICATIONS

B. Löfgren, J. Wikander, "Kinematic Control of Redundant Knuckle Booms," International Journal of Forest Engineering, Jan. 1, 2009, pp. 22-30.

A. Hansson, M. Servin, Semi-Autonomous Shared Control of Large-Scale Manipulator Arms, Control Engineering Practice, Jun. 1, 2010.

G. Antonelli, S. Chiaverini, M. Palladino, G.P. Gerio, G. Renga, "Cartesian Space Motion Planning for Robots, An Industrial Implementation," IEEE, Jun. 20, 2004, pp. 279-284.

K. Prorok, "Crane-Tip Control of a Hydraulic Crane: A New Approach," Umeå Universitet, Dec. 2, 2003.

E. Papadopoulos, S. Sarkar, "On the Dynamic Modeling of an Articulated Electrohydraulic Forestry Machine," McGill University, Aug. 2, 1996.

U. Mettin, P. La Hera, D. Morales, A. Shiriaev, L. Freidovich, S. Westerberg, "Path-Constrained Trajectory Planning and Time-Independent Motion Control: Application to a Forestry Crane," International Conference on Advanced Robotics, Jun. 26, 2009.

W. Mettin, S. Westerberg, A. Shiriaev, P. La Hera, "Motion Analysis and Trajectory Replanning of Human-Operated Manipulators: Application to a Forestry Crane," International Conference on Intelligent Robots and Systems, Mar. 1, 2009.

B. Löfgren, "Kinematic Control of Redundant Knuckle Booms," Licensed Thesis, Dept. of Machine Design, Royal Institute of Technology, Jan. 23, 2004.

B. Löfgren, "Kinematic Control of Redundant Knuckle Booms With Automatic Path-Following Functions," Doctoral Thesis, Dept. of Machine Design, Royal Institute of Technology, Nov. 9, 2009.

A. Putkonen, "Crane Control of Walking Harvester," Master of Science Thesis, Tampere University of Technology, Nov. 1996, p. 95.

T. Conradsson, F. Jonsson, Report on Measurement Solutions for Angular Position of the Slewing and Rotator Applied to the Laboratory Crane and the Komatsu Fowarder 830, Aug. 11, 2007, Umeå Universitet, Sweden.

A. Heinze, "Modelling, Simulation and Control of a Hydraulic Crane," Sep. 1, 2007, Munich University of Applied Sciences.

M. Brander, D. Eriksson, B. B. Löfgren, "Automotation of Knuckleboom Work Can Increase Productivity," Skogforsk, May 1, 2004.

J. Thati, F. Noorbasha, "Crane Forwarder-Control Algorithm for Automatic Extension of Prismatic Link," e-Journal of Science & Technology, May 1, 2011, pp. 47-56.

W. Westerberg, I. Manchester, W. Mettin, P. La Hera, A. Shiriaev, Virtual Environment Teleoperation of a Hydraulic Forestry Crane, IEEE International Conference on Robotics and Automation, May 23, 2008.

Kalle Prorok, Crane—Tip Control of a Hydraulic Crane: A New Approach, Dept. of Applied Physics and Electronics, Umea University, Umea, SE, Dec. 2, 2003.

Markus Saarela, Timber Cranes Coordinated Control, Master Thesis, Tampere University of Technology, Finland, Feb. 2005, Machine Translation.

* cited by examiner

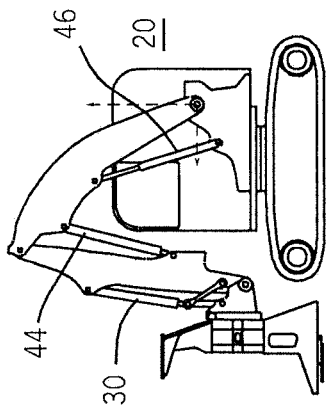
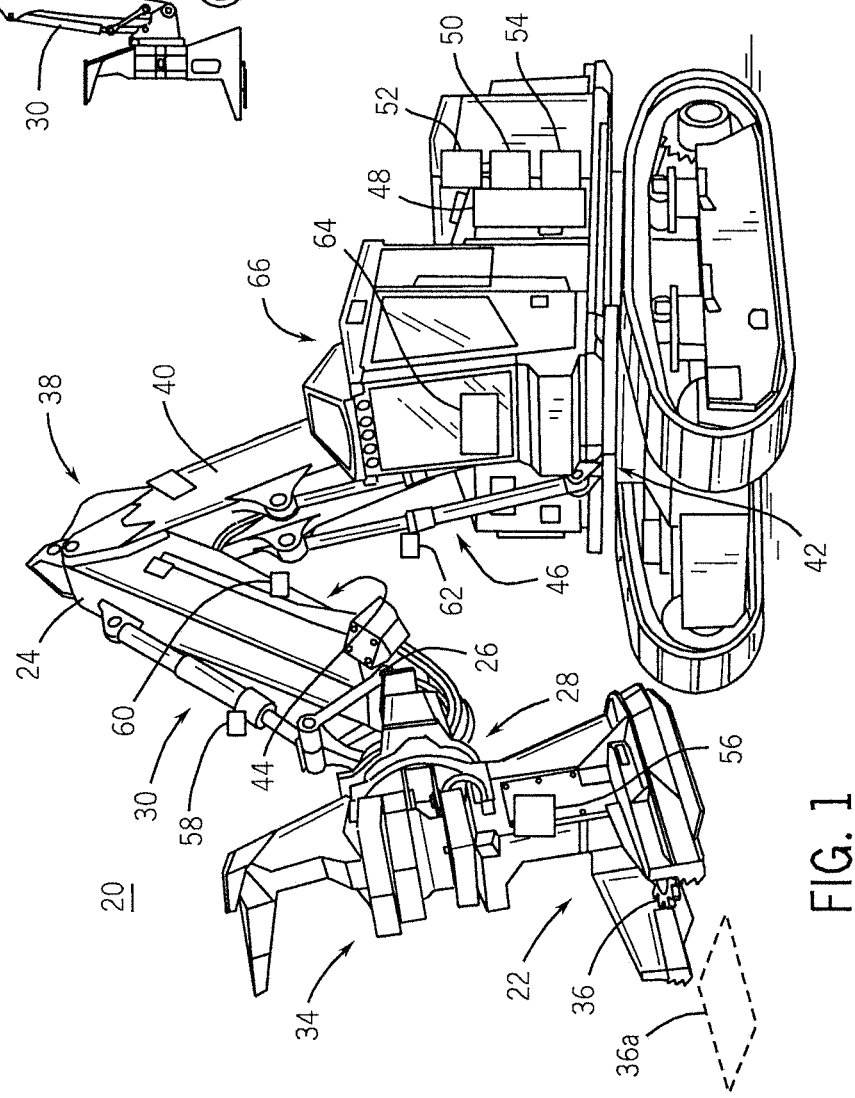
FIG. 2
FIG. 1

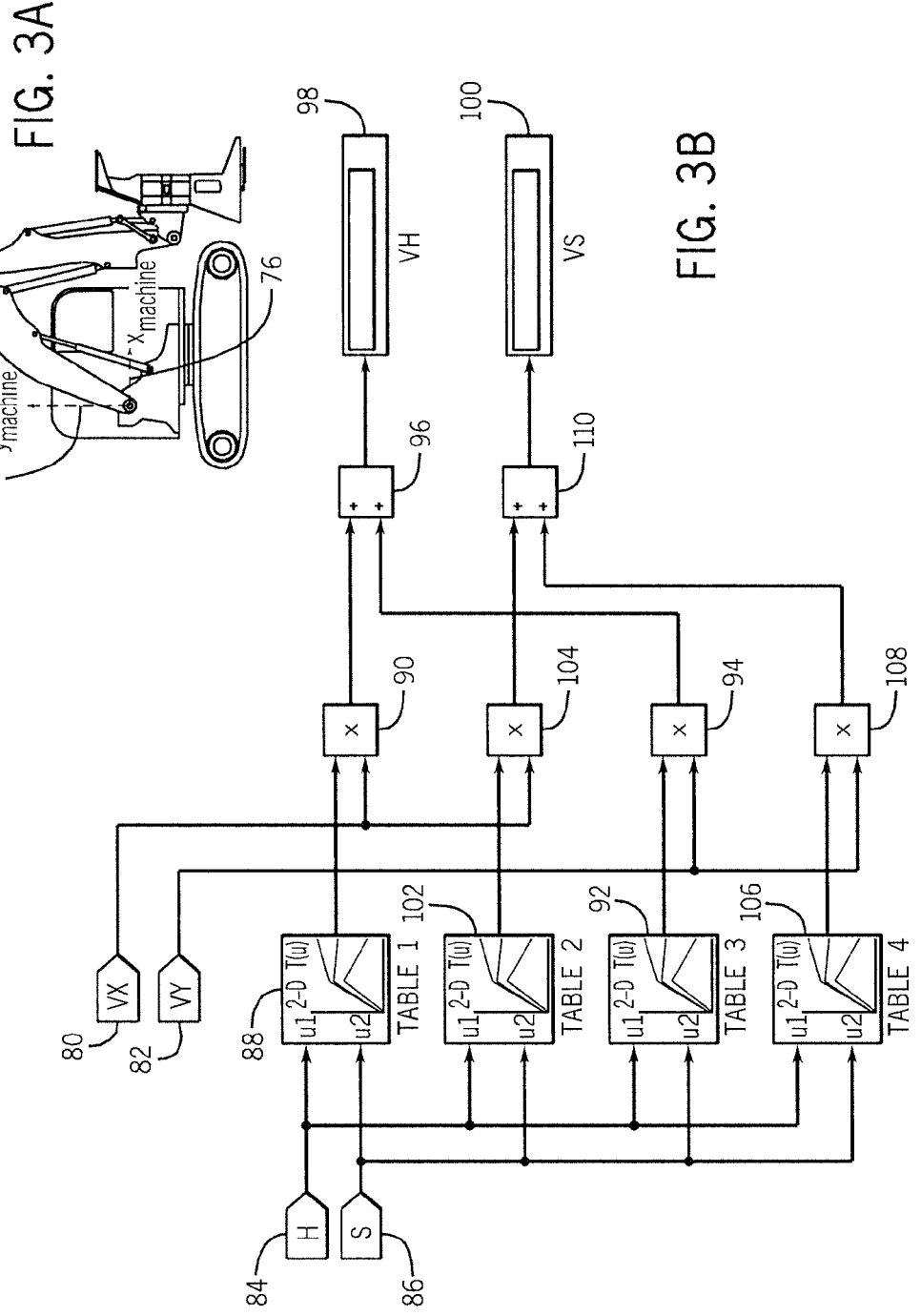

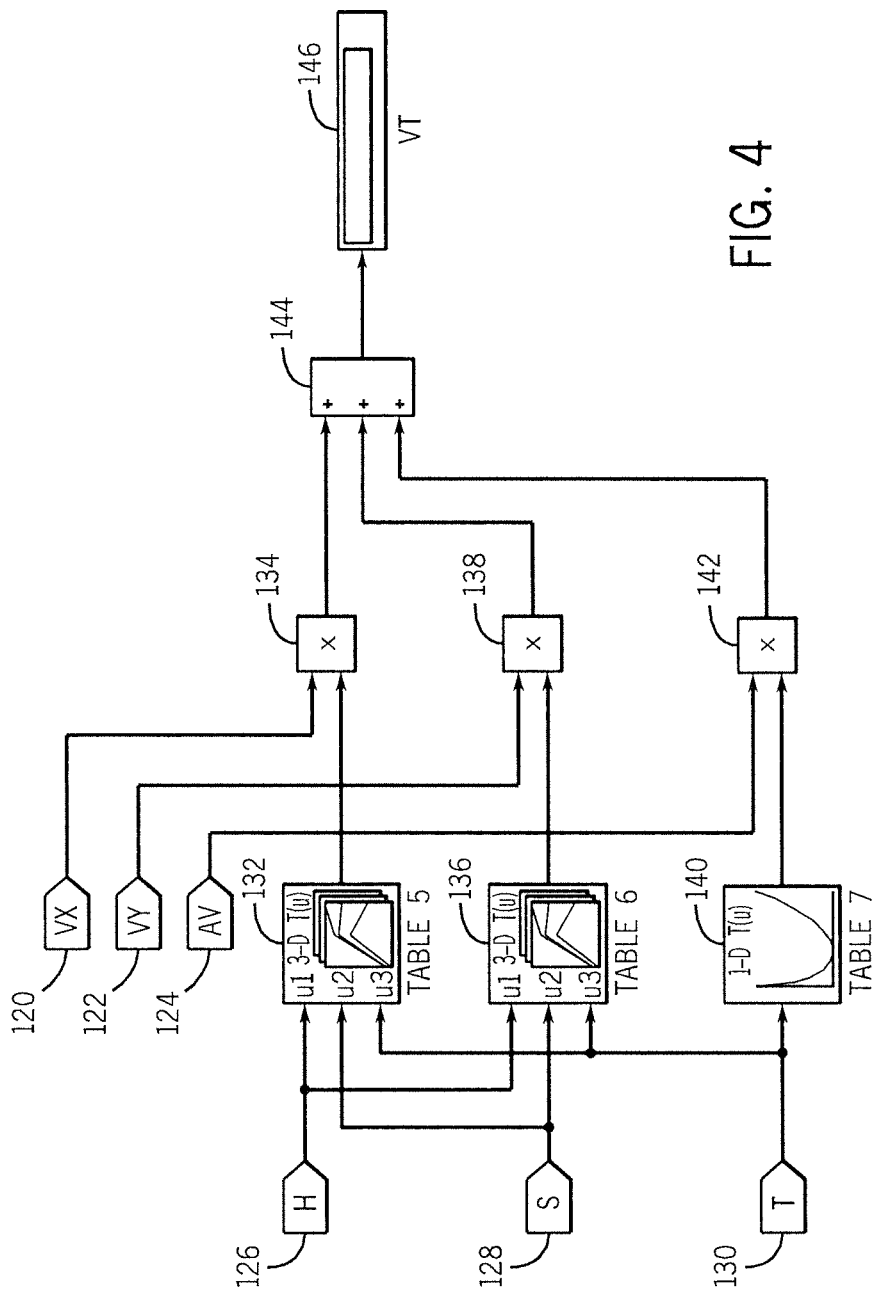

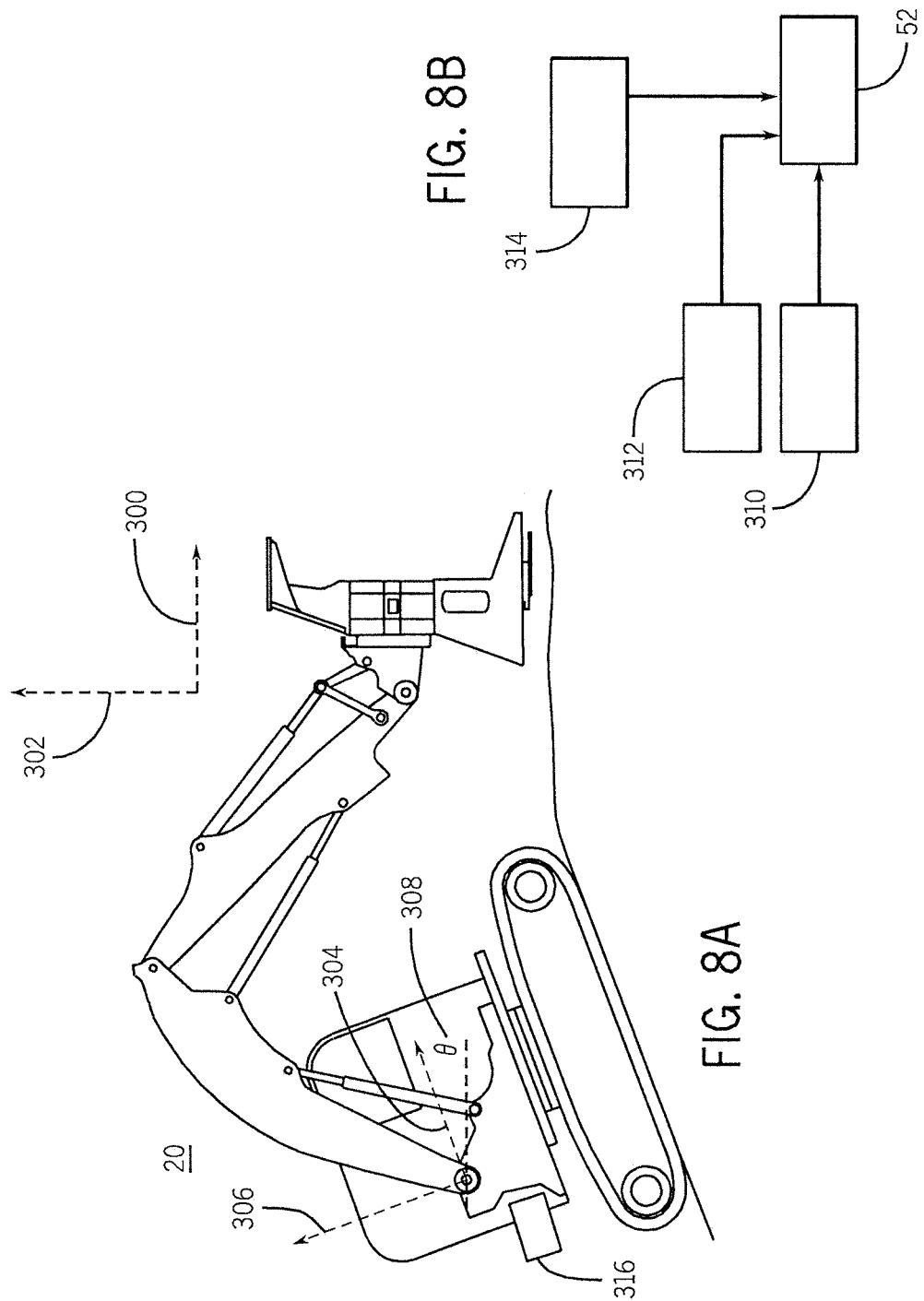

VELOCITY-BASED CONTROL OF END EFFECTOR

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to controlling movement of end effectors on work machines, including the movement of felling heads for feller bunchers.

BACKGROUND OF THE DISCLOSURE

An end effector is a tool, assembly, or other platform that is typically mounted to an extended boom or assembly in order to execute tasks at a distance from the frame of a work vehicle. In some configurations, an end effector can be mounted to a boom assembly extending away from a work vehicle frame, such that movement of the end effector can be moved via controlled movement of the boom.

In the forestry industry, for example, wheeled or tracked feller bunchers are used to harvest standing trees and transport cut trees. In known arrangements, a felling head with one or more saw discs may be mounted to a boom assembly of a feller buncher that includes multiple pivoting booms. Actuators may then be arranged on the boom assembly to pivot the booms relative to each other and thereby move the felling head.

When multiple booms are arranged in a boom assembly, controlled movement of an end effector may be relatively difficult, requiring significant investment in operator training. Under conventional control systems, for example, an operator may move a joystick along one axis to move actuators that pivot a first boom, and move the joystick along another axis to move actuators that pivot a second boom. In theory, an operator may control the two booms such that the aggregate movement of all of the actuators causes a desired movement of the end effector. However, the changing geometry of the two booms as they move relative to each other and the vehicle introduces significant complexity to the relationships between actuator movement and movement of the end effector. Accordingly, precise control of the end effector may be relatively difficult without significant skill and practice.

In this light, a control system for improved control of end effector movement is needed.

SUMMARY OF THE DISCLOSURE

According to one aspect of the disclosure, a control system is provided for moving an end effector of a work machine that includes a boom assembly with a hoist boom pivotally connected to a machine frame and movable relative to the machine frame by a hoist actuator, a stick boom pivotally connected to the hoist boom and movable relative to the hoist boom by a stick actuator, and an end effector pivotally connected to the stick boom at a stick pin and movable relative to the stick boom by a tilt actuator.

Sensors may sense indicators of a current orientation of the hoist boom, a current orientation of the stick boom, and a current orientation of the end effector. A controller may receive, via an input interface, signals corresponding to velocity input commands for a desired movement of the end effector. The controller may determine, based upon the velocity input commands and the indicators from the sensors, target actuator velocities for actuating the hoist actuator, the stick actuator, and the tilt actuator. The controller may then command the hoist actuator, the stick actuator, and the tilt actuator to move with the corresponding determined target actuator velocity, such that the end effector moves with an aggregate velocity corresponding to the desired movement.

According to another aspect of the disclosure, a control system is provided for moving an end effector of a work machine that includes a boom assembly connected to at a first end to a machine frame and connected at a second end to the end effector, the boom assembly including at least first and second booms separately movable, respectively, by first and second boom actuators.

Sensors may sense indicators of a current orientation of the first and second booms. An input interface may receive velocity input commands from an operator for a desired movement of the end effector, with the velocity input commands being received with at least first and second degrees of freedom. In a first kinematic mode of operation, a first and second velocity input command received at the input interface along, respectively, first and second degrees of freedom may indicate, respectively, desired horizontal and vertical velocities of the end effector relative to a reference frame.

A controller may receive, via the input interface, signals corresponding to the first and second velocity input commands. The controller may determine, based upon the velocity input commands and the indicators from the sensors, target actuator velocities for actuating the first and second boom actuators. The controller may then command the first and second boom actuators to move with the corresponding determined target actuator velocity, such that the end effector moves with an aggregate velocity corresponding to the desired movement.

According to still another aspect of the disclosure, a feller buncher includes a machine frame. A hoist boom may be pivotally connected to the machine frame and pivotally movable relative to the machine frame by a hydraulic hoist cylinder. A stick boom may be pivotally connected to the hoist boom and pivotally movable relative to the hoist boom by a hydraulic stick cylinder. A felling head may be pivotally connected to the stick boom via a wrist assembly with a stick pin and pivotally movable relative to the stick boom by a hydraulic tilt cylinder. The felling head may include a saw disc defining a cutting plane.

Sensors may sense indicators of a current length of each of the hoist cylinder, the stick cylinder, and the tilt cylinder. An input interface may receive velocity input commands from an operator with at least first, second and third degrees of freedom.

A controller may receive, via the input interface, signals corresponding to velocity input commands for a desired movement of the end effector. The controller may determine, based upon the velocity input commands and the indicators from the sensors, target actuator velocities for actuating the hoist actuator, the stick actuator, and the tilt actuator. The controller may then command the hoist actuator, the stick actuator, and the tilt actuator to move with the corresponding determined target actuator velocity, such that the end effector moves with an aggregate velocity corresponding to the desired movement.

In a first kinematic mode, velocity input commands received at the input interface along first, second, and third degrees of freedom may indicate, respectively, a desired horizontal velocity of the stick pin relative to a reference frame, a desired vertical velocity of the stick pin relative to the reference frame, and a desired tilt velocity for the end effector.

In a second kinematic mode, the target actuator velocities may be determined such that commanding the hoist cylinder, the stick cylinder and the tilt cylinder to move with the corresponding target actuator velocity causes the saw disc to move along the cutting plane.

The details of one or more implementations of the disclosure are set forth in the accompanying drawings and the description below. Other features and advantages will become apparent from the description, the drawings, and the claims.

BRIEF DESCRIPTION OF THE DRAWINGS

FIG. 1 is a perspective view of an example work machine with a boom-mounted end effector, in the form of a tracked feller buncher having a felling head mounted to a boom assembly;

FIG. 2 is a side schematic view of the feller buncher of FIG. 1;

FIG. 3A is a side schematic view of the feller buncher of FIG. 1 indicating a first reference frame;

FIG. 3B is a graphical representation of a control scheme for moving the end effector of FIG. 1 in a first kinematic mode, with respect to the first reference frame of FIG. 3A;

FIG. 4 is a graphical representation of another control scheme for moving the end effector of FIG. 1 in the first kinematic mode, with respect to the first reference frame of FIG. 3A;

FIG. 8A is a side schematic view of the feller buncher of FIG. 1 indicating a third reference frame;

FIG. 8B is a schematic view of velocity input commands with respect to the third reference frame of FIG. 8A;

Like reference numerals in the drawings indicate like components, parts, or operations.

DETAILED DESCRIPTION

Figure 5:
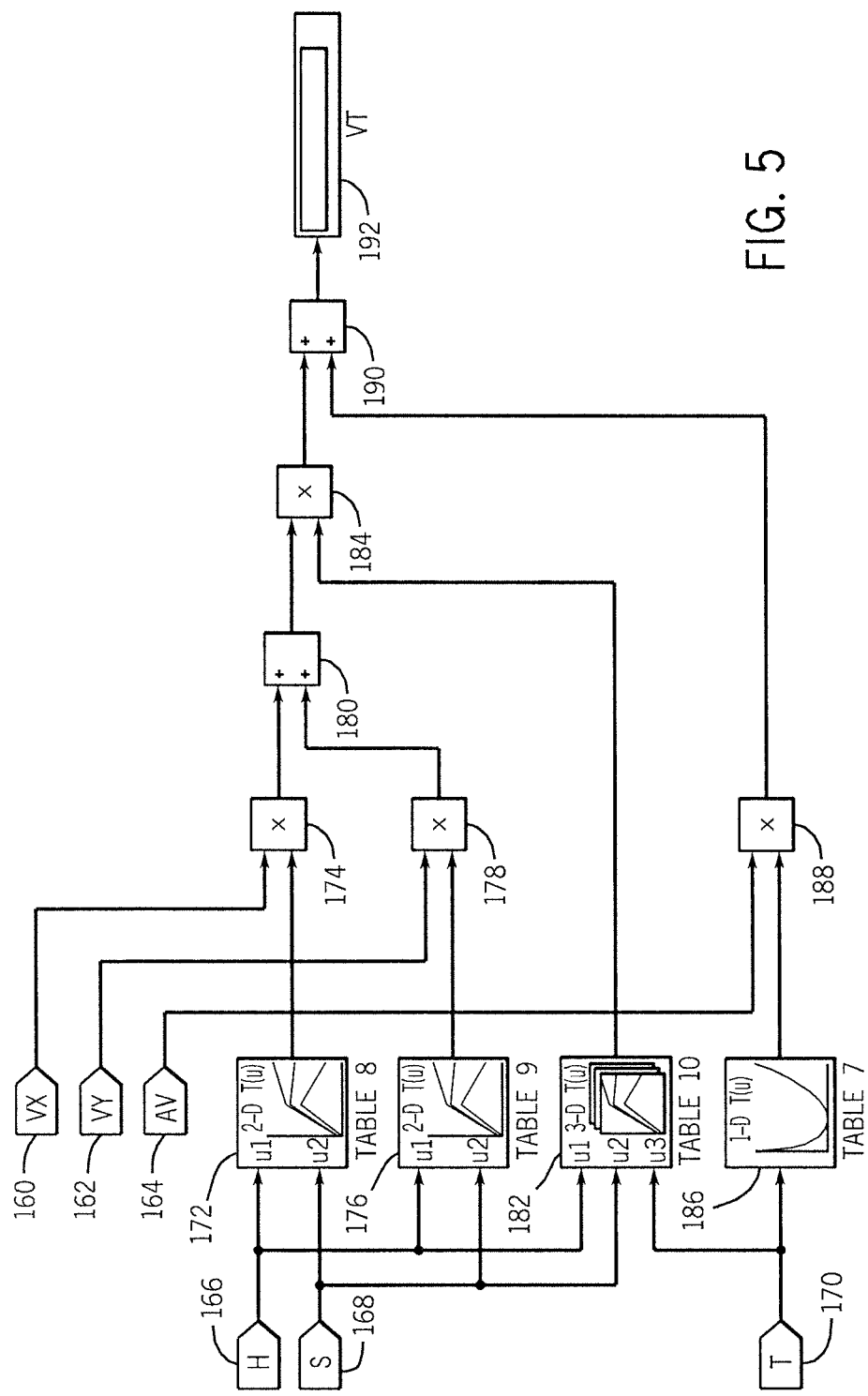
FIG. 5 is a graphical representation of yet another control scheme for moving the end effector of FIG. 1 in the first kinematic mode, with respect to the first reference frame of FIG. 3A.

The following describes one or more example implementations of the disclosed system for control of end effector movement, as shown in the accompanying figures of the drawings described briefly above. Generally, the disclosed control systems (and work vehicles on which they are implemented) allow for improved operator control of the movement of an end effector, as compared to conventional systems.

Generally, an end effector may be supported with respect to a work vehicle (or other work machine) by a boom assembly and the boom assembly may be moved by various actuators in order to accomplish tasks with the end effector. Discussion herein may sometimes focus on the example application of moving an end effector configured as a felling head for a feller buncher, with actuators for moving the felling head generally configured as hydraulic cylinders. In other applications, other configurations are also possible. In some embodiments, for example, sprayers, claws, grapples, or other devices may also be configured as movable end effectors. Likewise, work vehicles in some embodiments may be configured as excavators or other diggers, as forwarders, as skidders, as concrete crushers or similar machines, as sprayers, or in various other ways.

The disclosed control system may be used to receive velocity commands for movement of an end effector specifying a desired velocity of the end effector relative to a reference frame. The system may then determine velocity commands for various actuators such that the commanded movement of the actuators provides the commanded movement of the end effector. In this way, operator input along a limited number of degrees of freedom may be converted to commands for relatively complex movement of multiple actuators, in order to provide the desired movement of the end effector. This may generally permit intuitive operator input, in that an operator may directly indicate a desired movement (e.g., velocity) for the end effector, relative to a reference frame, rather than attempting to provide distinct actuator commands that would result in a desired movement of the end effector. As such, an operator may cause relatively precise movement of the end effector, without a detailed appreciation of a movement envelope of the end effector or a mapping of end effector position within the envelope to input device movement.

Generally, a boom assembly may include at least two booms that are separately movable by distinct actuators. For example, a first boom of a boom assembly may be attached to a frame of the work vehicle, and may be moved (e.g., pivoted) relative to the work vehicle by a first actuator. A second boom of the boom assembly may be attached to the first boom, and may be moved (e.g., pivoted) relative to the first boom by a second actuator. An end effector may be attached to the second boom and, in some embodiments, may be moved (e.g., pivoted) relative to the second boom by a third actuator. In this way, distinct movements of the first, second, and third actuators may correspond to distinct movements of the first boom, second boom, and end effector, respectively. Further, due to the configuration of the boom assembly, a movement of the first boom may cause a corresponding movement of the second boom and the end effector relative to the vehicle frame, and a movement of the second boom may cause a corresponding movement of the end effector relative to the first boom.

In one embodiment, for example, a felling head may be mounted to a feller buncher by a boom assembly with a hoist boom and a stick boom. The hoist boom may be pivotally attached to a frame of the feller buncher. The hoist boom may be generally pivoted with respect to the vehicle frame by an actuator (herein, a "hoist actuator"), such as a hydraulic cylinder (herein, a "hoist cylinder"). The stick boom may be pivotally attached to the hoist boom at a distance from the attachment of the hoist boom to the frame, such that the movement of the hoist boom relative to the vehicle frame also moves the stick boom. The stick boom may be generally pivoted with respect to the hoist boom by an actuator (herein, a "stick actuator") such as a hydraulic cylinder (herein, a "stick cylinder"). The felling head may be pivotally attached to the stick boom with a wrist assembly, at a distance from the attachment of the stick boom to the hoist boom. The felling head may be pivoted with respect to the stick boom (e.g., about a stick pin of the wrist assembly) by an actuator (herein, at "tilt actuator") such as a hydraulic cylinder (herein, a "tilt cylinder").

In some embodiments, the boom assembly may be configured such that the hoist boom, the stick boom and the felling head are pivoted by the various actuators along a common plane. Other actuators may then be configured to collectively move the entire boom assembly (e.g., by rotating the vehicle frame), in order to change the orientation of the common plane of movement for the boom assembly. Still other actuators may be configured to actuate the boom assembly, or other components, in other ways. For example, a particular actuator may be configured to rotate the felling head such that a cutting plane of a disc saw of the felling head is pivoted with respect to the common plane of movement for the boom assembly.

An input interface may be provided to receive velocity input commands (i.e., inputs representing vectors of velocity magnitude and direction) for movement of the end effector. In this regard, for example, velocity input commands may be distinguished from commands directly specifying a target position, or scalar speed commands (including as provided with respect to input specifying a target position). An input interface may be configured in various ways, including as an interface with multiple input devices such as joysticks, switches, knobs, levers, wheels, and so on.

In some embodiments, the nature of the velocity input commands, including the desired movement of the end effector corresponding to the commands, may vary depending on a current mode of operation for the control system. In a first kinematic mode of operation, for example, an operator may provide velocity input commands via the input interface along at least three degrees of freedom, with input along a first degree of freedom indicating a desired horizontal velocity for the end effector, input along a second degree of freedom indicating a desired vertical velocity for the end effector, and input along a third degree of freedom indicating a desired angular velocity (or "tilt velocity") for the end effector. As such, operator input may be relatively intuitive, in the first kinematic mode, as the operator may directly indicate a desired velocity (or velocities) for the end effector, relative to a reference frame, rather than guessing at a combination of actuator speeds that would result in a desired movement of the end effector.

Based upon the velocity input commands in the first kinematic mode (or in other modes), a controller may determine velocity commands for various actuators such that the end effector may be moved, in aggregate, as commanded by the operator (or otherwise desired). For example, with respect to the hoist boom, stick boom, and felling head assembly noted above, an operator may provide velocity input commands indicating desired horizontal, vertical, and tilt velocities for the felling head. Sensors may be utilized to detect indicators of a current orientation of the hoist boom, the stick boom, and the felling head, including the current tilt angle of the felling head. Based upon the current orientation of the booms and the felling head, the controller may then convert the velocity input commands for the end effector into velocity commands for the hoist, stick, and tilt cylinders, such that the commanded movement of the cylinders, in aggregate, causes the operator-commanded velocities for the felling head. In this way, as noted above, an operator may input relatively intuitive velocity commands for movement of the felling head, which may be automatically converted into the corresponding direct commands for movement of each relevant cylinder.

In some embodiments, the first kinematic mode may be provided as an alternative mode to a "joint" mode of operation, in which an operator provides velocity commands for movement of various actuators, rather than velocity commands for movement of the end effector. Continuing the example above, an operator may control movement of the felling head in joint mode by independently commanding movement of the various hydraulic cylinders. For example, the operator may provide input along a first degree of freedom to move the hoist cylinder, along a second degree of freedom to move the stick cylinder, and along a third degree of freedom to move the tilt cylinder with a particular tilt velocity. Accordingly, the operator may control movement of the end effector indirectly, by directly controlling movement of the various cylinders. The operator may then transition to the first kinematic mode, as appropriate, in order to control movement of the felling head via velocity input commands for the felling head itself, rather than for the various cylinders.

In some embodiments, a second kinematic mode may also be provided. In the second kinematic mode, the controller may be further configured to maintain a particular angular orientation (i.e., a particular "tilt orientation") of the end effector, with respect to a reference frame. This may be useful, for example, if an operator desires to move an end effector along a particular plane or tilt the end effector to an orientation that is in parallel with a commanded direction of movement.

In some implementations of the second kinematic mode, the controller may determine actuator commands for horizontal and vertical (i.e., translational) movement of an end effector based upon velocity input commands in a similar manner as in the first kinematic mode. Further, the controller may determine commands for a tilt actuator that maintain a particular tilt orientation of the end effector during the translational movement. In this way, an operator may command an aggregate translational movement of the end effector and the control system may automatically maintain a particular tilt orientation of the end effector during the movement. This may be useful, for example, in order to prevent a log carried by a feller buncher from rotating with respect to a reference frame when the log is being moved by a boom assembly.

In some implementations of the second kinematic mode, the tilt orientation of the end effector that is maintained by the commands from the controller may correspond to a plane that is aligned with the aggregate horizontal and vertical movement of the end effector. For example, horizontal and vertical velocities for an end effector (and the corresponding actuator velocity commands) may be determined, with the velocities of the end effector together defining a movement direction. A target tilt orientation for the end effector may then be determined based upon the movement direction. For example, for a requested translational movement of a felling head, a target tilt orientation for the felling head may be determined that aligns the cutting plane of a disc saw with the direction of the translational movement. This may be useful, for example, in order to align the disc saw with the commanded translational movement during a cutting operation.

In other implementations of the second kinematic mode, a target tilt orientation may be identified for an end effector (e.g., based upon operator or sensor input). Corresponding horizontal and vertical velocities for the end effector (and the corresponding actuator velocity commands) may then be determined based upon the target tilt orientation. This may be useful, for example, in order to move an end effector along a particular plane corresponding to the tilt orientation of the end effector. For example, for a particular tilt orientation of a felling head, which may define a particular cutting plane for the disc saw, actuator velocity commands may be determined in order to provide an aggregate movement of the end effector that is parallel to the cutting plane.

In some implementations, the same input devices (e.g., various devices of an input interface) may be used to provide input for various of the modes discussed herein. For example, a joystick used to provide velocity input commands in the joint mode may also be used to provide velocity input commands in either of the first or second kinematic modes. As such, for example, an operator may be able to utilize a common input interface (or at least common components of an input interface) to control movement of an end effector in various different ways.

As noted above, the disclosed hydraulic system may be utilized with regard to various machines with end effectors, including feller bunchers and other machines for cutting and sawing operations. Referring to FIGS. 1 and 2, in some embodiments, the disclosed system may be used with a feller buncher 20 to control movement of an end effector configured as a felling head 22 mounted to the end of a boom assembly 38. It will be understood that the configuration of the feller buncher 20 is presented as an example only.

In the embodiment depicted, the felling head 22 is pivotally mounted to a stick boom 24 of the boom assembly 38 at a stick pin 26 of a wrist assembly 28. A hydraulic cylinder 30 (also referred to herein as a "tilt cylinder") is mounted to the stick boom 24 and to a linkage 32 attached to the wrist assembly 28, such that the cylinder 30 may be actuated in order to pivot the felling head 22 about the stick pin 26. Due to the depicted assembly of the wrist assembly 28, a movement of the stick pin 26 may generally be viewed as a equivalent to a corresponding movement of the felling head 22 as a whole. In some embodiments, other actuators (not shown) may be utilized to provide other movement of the felling head 22 (e.g., rotation about an axis that is perpendicular to the stick pin 26).

Generally, a felling head may include a cutting mechanism for cutting standing trees or other objects, as well as various other features. As depicted, for example, the felling head 22 includes a saw disc 36 defining a cutting plane 36*a*, as well as clasping arms 34 for securing cut and un-cut trees to the felling head 22. Other end effectors may include other mechanisms, including mechanisms for tasks other than cutting and clasping. Similarly, other end effectors may include features that define a different reference plane.

Still referring to FIGS. 1 and 2, the boom assembly 38 also includes a hoist boom 40 that is pivotally attached to the stick boom 24 opposite the attachment of the stick pin 26 to the stick boom 24. The hoist boom 40 is also pivotally attached to a frame 42 of the feller buncher 20 opposite the attachment of the hoist boom 40 to the stick boom 24. A hydraulic cylinder 44 (also referred to herein as a "stick cylinder") is mounted to the stick boom 24 and to the hoist boom 40, such that the cylinder 44 may be actuated in order to pivot the stick boom 24 with respect to the hoist boom 40. Further, a hydraulic cylinder 46 (also referred to herein as a "hoist cylinder") is mounted to the hoist boom 40 and the vehicle frame 42, such that the cylinder 46 may be actuated in order to pivot the hoist boom 40 with respect to the vehicle frame 42.

In the embodiment depicted, the various booms 24 and 40, the wrist assembly 28, and the various hydraulic cylinders 30, 44, and 46 are configured to move the boom assembly 38 within a single boom assembly plane (e.g., a plane oriented along the page, with respect to FIG. 2). In other configurations, other movements of a boom assembly may be possible. Further, in some embodiments, a different number or configuration of cylinders or other actuators may be used. For example, two hoist cylinders 46 may be provided, rotational (or other) actuators may be used, and so on. Generally, the control system disclosed herein may be applied with respect to any type of actuator capable of producing relative movement of one or more booms (or other features) of a boom assembly relative to a vehicle frame or another component of the boom assembly.

Generally, it will be understood that the configuration of the boom assembly 38 is presented as an example only. In this regard, a hoist boom (e.g., the hoist boom 40) may be generally viewed as a boom that is pivotally attached to a vehicle frame, and a stick boom (e.g., the stick boom 24) may be viewed as a boom that is pivotally attached to a hoist boom at an attachment point that is removed from the vehicle frame, and that is also pivotally attached to an end effector. Similarly, a stick pin (e.g., the stick pin 26) may be generally viewed as a pin or similar feature effecting pivotal attachment of a stick boom to an end effector (e.g., via a wrist assembly). In this light, a tilt actuator (e.g., the tilt cylinder 30) may be generally viewed as an actuator for pivoting an end effector with respect to a stick boom, a stick actuator (e.g., the stick cylinder 44) may be generally viewed as an actuator for pivoting a stick boom with respect to a hoist boom, and a hoist actuator (e.g., the hoist cylinder) may be generally viewed as an actuator for pivoting a hoist boom with respect to a vehicle frame.

The feller buncher 20, may include one or more pumps 48, which may be driven by an engine of the feller buncher 20 (not shown). Flow from the pumps 48 may be routed through various valves 50 and various conduits (e.g., flexible hoses) in order to move one or more of the cylinders 30, 44, and 46. Flow from the pumps 48 may also power rotation of the saw disc 36, or various other components of the feller buncher 20. The flow from the pumps 48 may be controlled in various ways (e.g., through control of the various valves 50), in order to cause movement of the cylinders 30, 44 and 46 with a different velocities. In this way, for example, a target velocity for a particular cylinder may be implemented by various velocity output commands to the pumps 48, valves 50, and so on.

Generally, a controller 52 (or multiple controllers) may be provided, for control of various aspects of the operation of the feller buncher 20, in general). The controller 52 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 52 may be configured to execute various computational and control functionality with respect to the feller buncher 20 (or other machinery). In some embodiments, the controller 52 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 52 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 52 may be in electronic, hydraulic, mechanical, or other communication with various other systems or devices of the feller buncher 20 (or other machinery). For example, the controller 52 may be in electronic or hydraulic communication with various actuators, sensors, and other devices within (or outside of) the feller buncher 20, including various devices associated with the pumps 48, valves 50, and so on. The controller 52 may communicate with other systems or devices (including other controllers) in various known ways, including via a CAN bus (not shown) of the feller buncher 20, via wireless or hydraulic communication means, or otherwise. An example location for the controller 52 is depicted in FIG. 1. It will be understood, however, that other locations are possible including other locations on the feller buncher 20, or various remote locations.

In some embodiments, the controller 52 may be configured to receive input commands via an input interface 64, which may be disposed inside a cab 66 of the feller buncher 20 for easy access by an operator. The input interface 64 may be configured in a variety of ways. In some embodiments, the input interface 64 may include one or more joysticks, various switches or levers, a touchscreen interface, or various other input devices.

Various sensors may also be provided. In some embodiments, various sensors 54 (e.g., pressure, flow or other sensors) may be disposed near the pumps 48 and valves 50, or elsewhere on the feller buncher 20). In some embodiments, various sensors may be disposed near the felling head 22. For example, sensors 56 may be disposed on or near the felling head 22 in order to measure parameters including the rotational speed of the saw disc 36, hydraulic pressure for driving the saw disc 36 (e.g., via a hydraulic motor (not shown)), proximity of objects to the felling head 22, and so on. In some embodiments, sensors (e.g., linear position sensors 58, 60 and 62) may be configured to determine the length of the cylinders 30, 44, and 46, respectively, or detect various other indicators of the current orientation of the stick boom 24, hoist boom 40, and felling head 22. Other sensors may also (or alternatively) be used. For example, angular position or displacement sensors may be utilized in place of the linear position sensors 58, 60 and 62, in order to detect the angular orientation of the felling head 22, stick boom 24, and hoist boom 40, relative to each other or relative to the vehicle frame 42. In such a case, the detected angular orientations may provide alternative (or additional) indicators of the current position of the stick boom 24, the hoist boom 40, and the felling head 22. Similarly, in some embodiments, the sensors 58, 60, and 62 or similar other sensors may alternatively (or additionally) be configured to detect the velocity of movement of the cylinders 30, 44, and 46, respectively.

The various components noted above (or others) may be utilized to control movement of the felling head 22 via control of the movement of the various hydraulic cylinders 30, 44, and 46. Accordingly, these components may be viewed as forming part of the control system for movement of the felling head 22.

Generally, under the disclosed control system, and as discussed in greater detail herein, a velocity input command may be provided via an input interface in order to indicate a desired movement of the end effector with a desired velocity. For example, joysticks or other devices may be actuated along various degrees of freedom to indicate desired velocities for horizontal, vertical, and tilting movement of the end effector relative to a reference frame. Velocity commands for various actuators may be then determined in order to cause the end effector to move with the desired velocity (or another corresponding velocity). In this way, an operator may provide commands corresponding directly to a desired movement of the end effector, without concerning herself with the complexity of a set of corresponding movements of the actuators, which may vary considerably, for a desired movement of the end effector, depending upon the current orientation of the boom assembly 38. Accordingly, for example, identical input commands from an operator may cause horizontal (or other) movement of the end effector with identical velocities, regardless of the current orientation of the various booms of the boom assembly.

In some embodiments, the disclosed control system may provide for multiple modes of operation, including one or more of a "joint" mode, a first kinematic mode, and a second kinematic mode. In some embodiments, an input device (e.g., a switch on the input interface 64) may be provided for an operator to actively select a particular mode of operation. In some embodiments, the control system may be configured to automatically transition between the various modes based on a triggering event.

Generally, the joint mode may be a mode in which a machine operator provides separate velocity commands for each of several actuators for a boom assembly, so as to collectively move the end effector. With respect to the feller buncher 20, for example, an individual may provide input commands via the input interface 64 to directly indicate a desired velocity for the cylinders 30, 44, and 46, so as to change the relative positions of the stick boom 24, the hoist boom 40 and the felling head 22. In this regard, a velocity input command along a first degree of freedom (e.g., along a first axis of a first joystick of the input interface 64) may directly indicate a desired velocity for the hoist cylinder 46, in order to change the position of the hoist boom 40 relative to the frame 42. A velocity input command along a second degree of freedom (e.g., along a second axis for the first joystick) may directly indicate a desired velocity for the stick cylinder 44, in order to change the position of the stick boom 24 relative to the hoist boom 40. A velocity input command along a third degree of freedom (e.g., along a particular axis for a second joystick of the input interface 64) may directly indicate a desired velocity for the tilt cylinder 30, in order to tilt the felling head 22 relative to the stick boom 24. The controller 52 may accordingly convert each of the velocity input commands to signals that produce the intended cylinder velocities, such that the cylinders move as desired.

In some implementations, the use of velocity input commands as a basis of determining target actuator velocities may be implemented in an open loop system. Inherently, for example, once the current orientation of the boom assembly 38 is known, the disclosed control system may allow the felling head 22 to be moved with relatively high accuracy, without closed loop feedback, based upon the velocity input commands. In some implementations, however, the controller 52 (or other components) may incorporate a feedback control system to regulate differences between commanded cylinder velocities in the joint mode (i.e., as indicated by the velocity input commands) and the actual cylinder velocities (e.g., as measured by the sensors 58, 60, and 62). In some embodiments, for example, a closed loop PI feedback system may be used.

In contrast to the joint mode, the first kinematic mode may allow an operator to provide velocity input commands that directly indicate a desired velocity of the end effector, rather than a desired velocity of the various actuators. For example, with respect to the feller buncher 20, an operator may use input devices of the input interface 64 to provide velocity input commands that directly indicate, relative to a particular reference frame, a desired horizontal velocity of the felling head 22, a desired vertical velocity of the felling head 22, and a desired tilt velocity of the felling head 22. Based upon the current orientation of the boom assembly 38, the controller 52 may then convert the collective set of velocity input commands into signals that move the various cylinders 30, 44, and 46 with velocities that collectively produce an aggregate velocity of the felling head 22 corresponding to the velocity input commands. In some embodiments, for example, the controller 52 may receive signals from the various sensors 58, 60, and 62 that indicate a current orientation of the various cylinders 30, 44, and 46 as well as receiving the velocity input commands via the input interface 64. Using lookup tables, sets of kinematic equations, or other techniques, the controller 52 may then determine movements for the individual cylinders 30, 44, and 46 that collectively produce the desired aggregate velocity of the felling head 22.

In some implementations, the use of velocity input commands as a basis of determining target actuator velocities in the first kinematic mode may be implemented in an open loop system. Inherently, for example, once the current orientation of the boom assembly 38 is known, the disclosed control system may allow the felling head 22 to be moved with relatively high accuracy, without closed loop feedback, based upon the velocity input commands. However, as in the joint mode, various feedback control systems may be used in the first kinematic mode to regulate differences between the commanded end effector speeds (i.e., as indicated by the velocity input commands) and the actual end effector speeds (e.g., as indicated by the collective output of sensors 58, 60, and 62). In some embodiments, for example, a closed loop PI feedback system may be used.

In a second kinematic mode, control similar to the first kinematic mode (or other modes) may be implemented, but the controller 52 may be configured to move the felling head 22 so as to ensure that the saw disc 36 remains in a single plane (e.g., the cutting plane 36a of the saw disc 36) during the movement. This may be useful, for example, to cut a standing tree without requiring an operator to actively maintain a particular orientation of the saw disc 36.

In the second kinematic mode, velocity input commands may take a variety of forms. In some implementations, for example, velocity input commands for the second kinematic mode may include commands for desired horizontal and vertical movement of the felling head 22, but not for a desired tilt velocity of the felling head 22. A target tilt orientation (e.g., a target orientation of the cutting plane 36a of the saw disc 36) may then be determined based upon the desired translational movement and tilt velocity commands for the tilt cylinder 30 determined accordingly. In some implementations, a velocity input command for the second kinematic mode may indicate a desired movement direction of the felling head 22 or a desired movement direction and velocity magnitude. Based upon this input, a target tilt orientation for the felling head 22 (e.g., a target orientation of the cutting plane 36a) may then be determined. In some implementations, a velocity input command for the second kinematic mode may include merely a command to initiate the second kinematic mode (e.g., to transition from the joint mode or first kinematic mode). In such a case, for example, a target tilt orientation may be determined based upon a current tilt orientation of the felling head 22, based upon a predetermined target tilt orientation (e.g., for a particular type of cutting operation), or in other ways. In some implementations, other alternative (or additional) input commands may be used.

In some implementations, the use of velocity input commands as a basis of determining target actuator velocities in the second kinematic mode may be implemented in an open loop system. Inherently, for example, once the current orientation of the boom assembly 38 is known, the disclosed control system may allow the felling head 22 to be moved with relatively high accuracy, without closed loop feedback, based upon the velocity input commands. However, as in the joint and first kinematic modes, various feedback control systems may be used in the second kinematic mode to regulate differences between the commanded end effector speeds (e.g., as indicated by or determined from the velocity input commands) and the actual end effector speeds (e.g., as indicated by the collective output of sensors 58, 60, and 62). In some embodiments, for example, a closed loop PI feedback system may be used.

It will be understood that the closed loop control system for one or more of the modes discussed herein may include proportional, integral, or derivative gains (or various combinations thereof) to minimize velocity differences, or errors, and that the values of the various gains may be adjusted to provide speed controls that provide acceptable levels for responsiveness and stability. Speed measurements for the closed loop control system may be provided directly by velocity measurements from the sensors 58, 60, and 62, may be calculated by the controller 52 based on differences in cylinder length measurements over short time intervals (e.g., as may be alternatively measured by the sensor 58, 60, and 62), or may be determined in various other ways.

The control scheme of using velocity input commands for an end effector to determine velocity commands for various actuators may provide various advantages. For example, it may be relatively intuitive for an operator of the feller buncher 20 to provide input commands corresponding to a desired aggregate velocity (or components thereof) of the felling head 22, such that even relatively inexperienced operators may control movement of the felling head 22 with relative precision. Further, when an operator ceases to provide velocity input commands, the system may be configured to effectively stop movement of the felling head 22, as appropriate. For example, where various joysticks are used to provide operator input via the input interface 64, an operator releasing the joysticks (or returning the joysticks to a home position) may unambiguously indicate that the movement of the felling head 22 should cease. In contrast, for example, when an operator provides commands for target orientation of the felling head 22, it may sometimes be unclear whether an end to the input command indicates a desire to stop the movement, or whether movement should continue until the felling head 22 reaches the command orientation. Likewise, where various joysticks (or other devices) are used to provide position-based (rather than velocity-based) commands, and an operator releases the joysticks or returns the joysticks to a home position, it may be unclear whether the operator desires the felling head 22 to return to a home orientation, remain in the current orientation, or continue movement to a previously commanded orientation.

As another advantage of the disclosed system, movement of an end effector corresponding to velocity input commands may be easily scaled in various ways through scaling of velocity output commands for the relevant actuators. For example, velocity input commands provided via the input interface 64 may sometimes correspond to velocity output commands that would require an actuation of the various cylinders 30, 44 and 46 that exceeds a current capability of the feller buncher 20 (e.g., that exceeds, in aggregate, flow available from the pumps 48. If such a discrepancy is identified (e.g., based upon monitoring of the relevant system components by the controller 52), the velocity output commands for the cylinder 30, 44, and 46 may be automatically reduced in order to provide an aggregate movement of the felling head 22 that is similar, but generally slower, than the desired movement indicated by the velocity input commands. Indeed, in certain embodiments, the desired direction of movement may be maintained through a proportional (e.g., equal percentage) reduction of the velocity output commands for each of the cylinders 30, 44, and 46.

Referring also to FIGS. 3A and 3B, one approach for implementing the first kinematic mode is to configure the controller 52 to accept velocity input commands for horizontal and vertical velocity of the felling head 22 (e.g., as measured at the stick pin 26), and for the tilt velocity of the felling head 22 with respect to a Cartesian coordinate system aligned with a reference frame of the feller buncher 20. An example of such a coordinate system, referred to herein as a "machine reference frame," is represented with respect to the feller buncher 20 in FIG. 3A, with horizontal direction 76 and vertical direction 78. The input interface 64 may accordingly receive velocity input commands indicating desired horizontal and vertical velocities of the felling head 22 with respect to the horizontal and vertical directions 76 and 78 (e.g., velocity input commands provided along respective degrees of freedom), and velocity output commands indicating target velocities for the cylinders 30, 44, and 46 may be determined accordingly.

In one implementation, an example of which is represented in FIG. 3B, lookup tables, kinematic equations, or other means may be used to determine commanded velocities for various actuators that correspond to each of a unit horizontal velocity movement of the end effector and a unit vertical velocity movement of the end effector. The determined commanded velocities for unit velocity movement of each of the actuators may then be multiplied by the desired horizontal and vertical velocities of the end effector that correspond to received velocity input commands for, respectively, horizontal and vertical movement. The resulting component velocities for each actuator (i.e., the velocities of each actuator corresponding to the desired horizontal and vertical movements) may then be added to determine a final velocity output command for each actuator, indicating, respectively, corresponding target actuator velocities.

Still referring to FIG. 3B, for example, velocity input commands 80 and 82 for horizontal and vertical velocities, respectively, of the felling head 22 may be received along separate degrees of freedom at the input interface 64. Further, signals 84 and 86 indicating measured lengths (or other parameters, such as measured velocities) for the hoist cylinder 46 and the stick cylinder 44, respectively, may be received from the sensors 62 and 60. The controller 52 may then process the velocity input commands 80 and 82 and the sensor signals 84 and 86 in order to determine velocity commands for the cylinders 46 and 44, and thereby provide the desired movement of the felling head 22.

As depicted, a lookup table 88 may provide an output value for a hoist cylinder velocity that may be required to produce, for a given orientation of the boom assembly 38, a unit horizontal velocity of the stick pin 26 with zero vertical velocity of the stick pin 26. This normalized cylinder velocity may then be multiplied 90 by the horizontal velocity input command 80, in order to provide a component of a target actuator velocity (and corresponding velocity output command) for the hoist cylinder 46 that corresponds to the desired horizontal movement of the stick pin 26. Similarly, a lookup table 92 may provide an output value for a hoist cylinder velocity required to produce, for a given orientation of the boom assembly 38, a unit vertical velocity of the stick pin 26 with zero horizontal velocity of the stick pin 26. This normalized cylinder velocity may then be multiplied 94 by the vertical velocity input command 82, in order to provide a component of a velocity command for the hoist cylinder 46 corresponding to the desired vertical movement of the stick pin 26. The output values of the multiplication blocks 90 and 94 may then be added 96 in order to determine a target actuator velocity (and corresponding velocity output command 98) for the hoist cylinder 46.

In a similar fashion, the velocity input commands 80 and 82 and the sensor signals 84 and 86 may be processed to determine a target actuator velocity (and corresponding velocity output command 100) for the stick cylinder 44. For example, a lookup table 102 may provide an output value for a stick cylinder velocity required to produce, for a given orientation of the boom assembly 38, a unit horizontal velocity of the stick pin 26 with zero vertical velocity of the stick pin 26. This normalized cylinder velocity may then be multiplied 104 by the horizontal velocity input command 80, in order to provide a component of the target actuator velocity (and corresponding velocity output command 100) for the stick cylinder 26 that corresponds to the desired horizontal movement of the stick pin 26. Similarly, a lookup table 106 may provide an output value for a stick cylinder velocity required to produce, for a given orientation of the boom assembly 38, a unit vertical velocity of the stick pin 26, with zero horizontal velocity of the stick pin 26. This normalized cylinder velocity may then be multiplied 108 by the vertical velocity input command 82, in order to provide a component of the target actuator velocity (and the corresponding velocity output command 100) for the stick cylinder 26 that corresponds to the desired vertical movement of the stick pin 26. The output values of the multiplication blocks 104 and 108 may then be added 110 in order to determine the target actuator velocity (and corresponding velocity output command 100) for the hoist cylinder 46.

It will be understood, for the implementation represented in FIG. 3B, and other implementations, that other calculation methods and control strategies may be used. For example, rather than use the lookup tables 88, 92, 102 and 106, the controller 52 may be configured to solve various kinematic equations for the boom assembly 38 in order to determine the appropriate velocity commands for the cylinders 44 and 46.

Referring also to FIG. 4, an example approach for achieving a desired tilt velocity for the felling head 22 is represented, for the first kinematic mode. Under this example approach, components of target actuator velocities (and corresponding velocity output commands) for the cylinders 44 and 46 may be determined as described with respect to FIG. 3B, but with additional input to the various lookup tables relating to the current tilt orientation of the felling head 22. Further, another lookup table (or similar means) may be used to determine command velocities for the tilt cylinder 30 that correspond to a unit tilt velocity of the felling head 22.

As depicted in FIG. 4, for example, velocity input commands 120, 122, and 124 for horizontal, vertical and tilt velocities, respectively, of the felling head 22 may be received along separate degrees of freedom at the input interface 64. Further, signals 126, 128, and 130 indicating measured lengths (or other parameters, such as measured velocities) for the hoist cylinder 46, the stick cylinder 44, and the tilt cylinder 30, respectively, may be received from the sensors 62, 60, and 58. In some implementations, the velocity input commands 120 and 122 and the sensor signals 126 and 128 may be the same as the velocity input commands 80 and 82, and sensor signals 84 and 86, respectively.

The controller 52 may process the velocity input commands 120, 122, and 124 and the sensor signals 126, 128, and 130 in order to determine velocity commands for the tilt cylinder 30, and thereby provide the desired tilt velocity of the felling head 22. For example, lookup table 132 may provide an output value for a tilt cylinder velocity that may be required to maintain, for a given orientation of the boom assembly 38 and during a unit horizontal velocity movement of the felling head 22, a constant tilt orientation of the felling head 22 relative to the reference frame of FIG. 3A (i.e., to produce zero tilt velocity for the felling head 22 during a commanded horizontal movement). This normalized tilt cylinder velocity may then be multiplied 134 by the horizontal velocity input command 120, in order to provide a component of a target actuator velocity (and a corresponding velocity output command 146) for the tilt cylinder 30 corresponding to the maintaining of the felling head 22 at a constant tilt orientation during the commanded horizontal movement.

Similarly, lookup table 136 may provide an output value for a tilt cylinder velocity that may be required to maintain, for a given orientation of the boom assembly 38 and during a unit vertical velocity movement of the felling head 22, a constant tilt orientation of the felling head 22 relative to the reference frame of FIG. 3A (i.e., to produce zero tilt velocity for the felling head 22 during a commanded vertical movement). This normalized tilt cylinder velocity may then be multiplied 138 by the vertical velocity input command 122, in order to provide a component of the target actuator velocity (and a corresponding velocity output command 146) corresponding to the maintaining of the felling head 22 at a constant tilt orientation during the commanded vertical movement.

Further, lookup table 140 may provide an output value for a tilt cylinder velocity that may be required to rotate the felling head with a unit tilt velocity when the velocity of the stick pin 26 is zero (i.e., to produce a commanded tilt velocity when there is no concurrent horizontal or vertical movement of the felling head 22). This tilt cylinder velocity may then be multiplied 142 by the tilt velocity input command 124 in order to provide a component of the target actuator velocity (and a corresponding velocity output command 146).

The output values of the multiplication blocks 134, 138 and 142 may then be added 144 in order to determine the total target actuator velocity (and the corresponding velocity output command 146) for the tilt cylinder 30. In this way, for any commanded translational movement of the felling head 22 (e.g., as indicated by the velocity input commands 120 and 122), a target tilt actuator velocity (e.g., as corresponds to the tilt velocity output command 146) may be determined so as to implement a commanded tilt velocity of the felling head 22 (e.g., as indicated by the velocity input command 124).

In other implementations, other approaches may be used. In some implementations, for example, tilt control for an end effector may be linearized, such that a constant actual tilt velocity may be provided for a given tilt velocity input command, regardless of the current (and, potentially, changing) orientation of the relevant boom assembly. Generally, for example, lookup tables, kinematic equations, or other means may provide values for angular velocities of a boom to which an end effector is attached, which may be required to produce a unit horizontal velocity and zero vertical velocity of an end effector, for a current orientation of a boom assembly. Similarly, values may be provided for angular velocities of the boom that may be required to produce a unit vertical velocity and zero horizontal velocity of the end effector. These values may then be multiplied, respectively, by horizontal and vertical velocity input commands and the results added together, such that an aggregate angular velocity of the boom for the commanded translational movement may be obtained. Values may then be provided (e.g., via lookup tables or equations) for tilt cylinder velocities that maintain a constant tilt orientation of the end effector for a unit angular velocity of the boom, and these values may be multiplied by the aggregate angular velocity described above to provide a component of a target tilt actuator velocity (and corresponding tilt velocity output command) for the tilt actuator that may be required to maintain a constant tilt orientation of the end effector for the commanded translational movement. Finally, a component of the target actuator velocity (and corresponding tilt velocity output command) may be determined that may provide a commanded tilt velocity during zero translational movement of the end effector (e.g., as described above with respect to lookup table 140 of FIG. 4), and the two components of the tilt velocity output command may be added together to provide a target actuator velocity (and corresponding velocity output command) that may provide the desired aggregate tilting movement.

Referring also to FIG. 5, for example, velocity input commands 160, 162, and 164 may be received via the input interface 64 for desired horizontal, vertical and tilt velocities of the felling head 22, respectively. As with the velocity inputs of other examples, the inputs 160, 162 and 164 may be received, in some implementations, along separate degrees of freedom. For example, the velocity input command 160 may be received along a first degree of freedom with a first joystick of the input interface 64, the velocity input command 162 may be received along a second degree of freedom with the first joystick, and the velocity input command 164 may be received along a third degree of freedom with another joystick (or other device) of the input interface 64. In other implementations, other arrangements may also be possible.

As depicted in FIG. 5, the lookup table 172 may provide an output value for an angular velocity of the stick boom 24 that may be required to produce, for a current orientation of the boom assembly 38, a unit horizontal velocity of the stick pin 26 and zero vertical velocity of the stick pin 26. Similarly to the implementations discussed above, the current orientation may be indicated by sensor signals 166 and 168, which may indicate current orientations of the hoist and stick cylinders 46 and 44. The output of the lookup table 172 may then be multiplied 174 by the horizontal velocity input command 160, such that the product represents the angular velocity of the stick boom 24 required to produce the desired horizontal velocity of the felling head 22.

Continuing with regard to FIG. 5, the lookup table 176 may provide an output value for the angular velocity of the stick boom 24 that may be required to produce, for a current orientation of the boom assembly 38, a unit vertical velocity of the stick pin 26 along with zero horizontal velocity of the stick pin 26. As above, the current orientation of the boom assembly 38 may be indicated by the sensor signals 166 and 168. The output of the lookup table 176 may then be multiplied 178 by the vertical velocity input command 162, such that the product represents the angular velocity of the stick boom 24 required to produce the desired vertical velocity of the felling head 22. The results of the multiplications 174 and 178 may then be added 180 in order to provide a combined angular velocity of the stick boom 24 that will provide the desired horizontal and vertical velocities of the felling head 22.

Meanwhile, the lookup table 182 may provide values for a tilt cylinder velocity that may be required to maintain a zero angular velocity of the felling head 22 for a unit angular velocity of the stick boom 24 (e.g., 1 radian/second), based on the current orientation of the boom assembly 38. As depicted, the current orientation may be indicated by the sensor signals 166 and 168, and by a sensor signal 170 corresponding to the current disposition of the tilt cylinder 30. The output of the lookup table 182 may then be multiplied 184 by the result of the addition 180, in order to provide a tilt cylinder velocity that is required to maintain zero tilt velocity of the felling head 22 for the commanded horizontal and vertical velocities of the felling head 22 (i.e., as indicated by the velocity input commands 160 and 162).

A further lookup table 186 may then be configured similarly to the lookup table 140 of FIG. 4, such that the lookup table 186 may provide an output value for a tilt cylinder velocity required to rotate the felling head with a unit tilt velocity when the velocity of the stick pin 26 is zero. This normalized cylinder velocity may then be multiplied 188 by the tilt velocity input command 164 such that the product indicates a tilt cylinder velocity that may correspond to the tilt velocity input command 164. This product may then be added 190 to the product of the multiplication 184 in order to determine a total target actuator velocity (and a corresponding velocity output command 192) for the tilt cylinder 30 that may provide the commanded tilt velocity during the commanded translational movement.

In other implementations, velocity input commands may be provided, and target actuator velocities (and corresponding velocity output commands) determined, with respect to a different reference frame than that depicted in FIG. 3A. For example, referring also to FIG. 6A, one approach for implementing the first kinematic mode may include configuring the controller 52 to accept velocity input commands for horizontal and vertical velocity of the felling head 22 (e.g., as measured at the stick pin 26), and for the tilt velocity of the felling head 22, with respect to a Cartesian coordinate system aligned with a reference frame of the felling head 22 itself (generally referred to herein as an "end effector reference frame"). An example of such a coordinate system is represented with respect to the feller buncher 20 in FIG. 6A, with a horizontal direction 200 and a vertical direction 202. As depicted, the horizontal direction 200 may be aligned with the cutting plane 36a of the disc saw 36. It will be understood, however, that other implementations are possible.

Figures 6A, 6B:
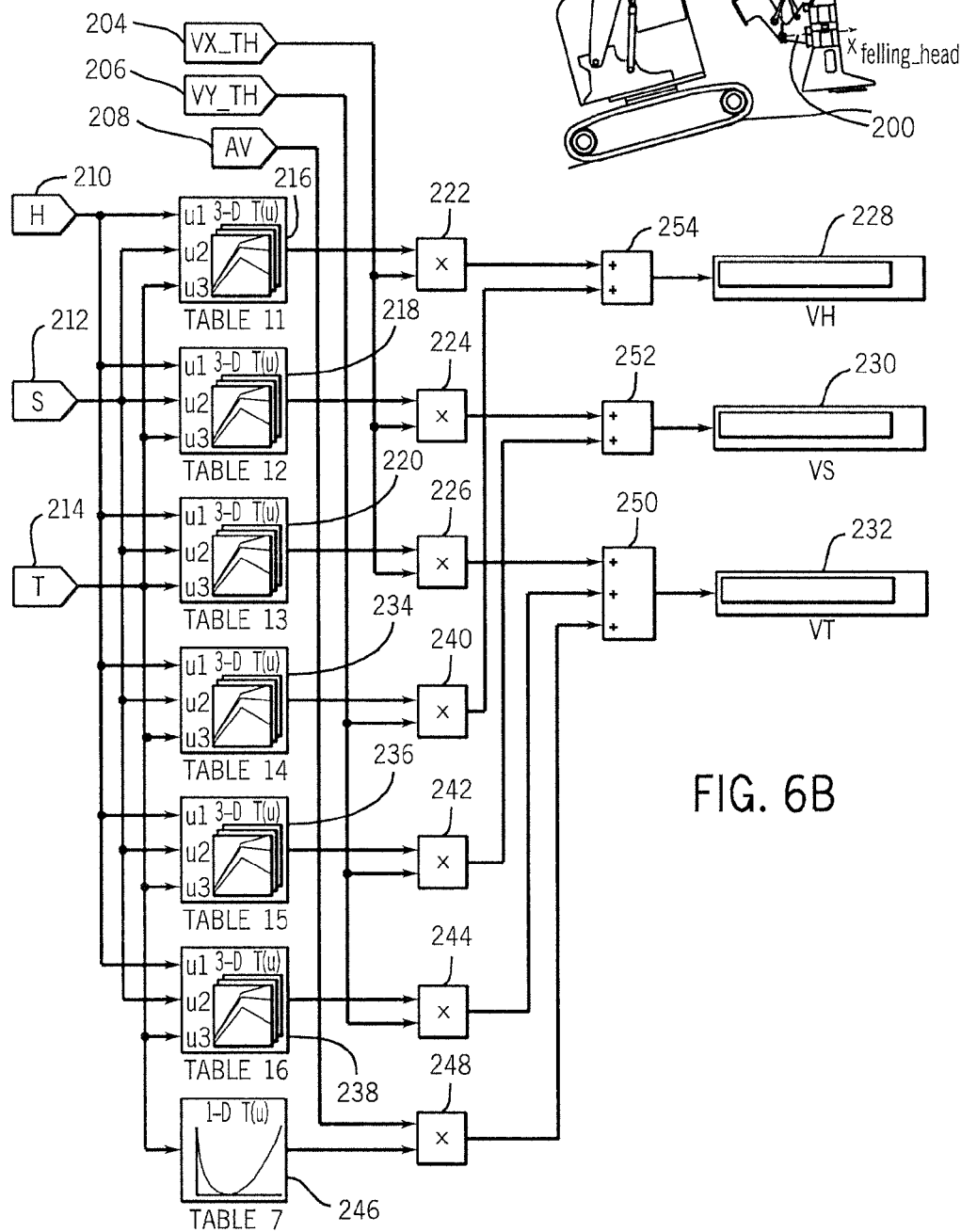
FIG. 6A is a side schematic view of the feller buncher of FIG. 1 indicating a second reference frame.
FIG. 6B is a graphical representation of a control scheme for moving the end effector of FIG. 1 in the first kinematic mode, with respect to the second reference frame of FIG. 6A.

FIG. 6B depicts an implementation that utilizes the reference frame of FIG. 6A, although other implementations may be possible. As depicted, velocity input commands 204, 206, and 208 may be received along separate degrees of freedom at the input interface 64, with the commands 204, 206, and 208 indicating, respectively, desired horizontal, vertical and tilt velocities of the felling head 22, with respect to the reference frame of FIG. 6A. Accordingly, as depicted, the received velocity input commands 204, 206, and 208 may correspond, respectively, to a desired movement of the felling head 22 along the cutting plane 36a of the saw disc 36, a desired movement of the felling head 22 perpendicular to the cutting plane 36a, and a desired tilting of the felling head 22 relative to the cutting plane 36a. Similarly to discussion above, signals 210, 212, and 214 may be received from the sensors 62, 60, and 58, and may indicate measured lengths (or other parameters, such as measured velocities) for the hoist cylinder 46, the stick cylinder 44, and the tilt cylinder 30, respectively.

The controller 52 may process the velocity input commands 204, 206, and 208 and the sensor signals 210, 212, and 214 in order to determine velocity commands for the cylinders 46 and 44, and thereby provide the desired movement of the felling head 22. For example, lookup tables 216, 218, and 220 may provide, respectively, values for the hoist cylinder velocity, the stick cylinder velocity, and the tilt cylinder velocity that may be required to produce a unit horizontal velocity of the felling head 22 (with respect to the reference frame of FIG. 6A) when there are no velocity input commands for vertical or tilt velocities for the felling head 22. Accordingly, based upon the current orientation of the felling head 22, as indicated by the signals 210, 212, and 214, the outputs of the tables 216, 218, and 220 may be multiplied by the horizontal velocity input command 204 to indicate, respectively, components of a target hoist cylinder velocity (and a corresponding hoist cylinder velocity output command 228), a target stick cylinder velocity (and a corresponding stick cylinder velocity output command 230), and a target tilt cylinder velocity (and a corresponding tilt cylinder velocity command 232) that may correspond to movement of the felling head 22 that correspond to the horizontal velocity input command 204.

Further, lookup tables 234, 236, and 238 may provide, respectively, values for the hoist cylinder velocity, the stick cylinder velocity, and the tilt cylinder velocity that may be required to produce a unit vertical velocity of the felling head 22 (with respect to the reference frame of FIG. 6A) when there are no velocity input commands for horizontal or tilt velocities for the felling head 22. Accordingly, based upon the current orientation of the felling head 22, as indicated by the signals 210, 212, and 214, the outputs of the tables 234, 236, and 238 may be multiplied 240, 242, and 244, respectively, by the vertical velocity input command 206 to indicate, respectively, components of the target hoist cylinder velocity (and the hoist cylinder velocity output command 228), the target stick cylinder velocity (and the stick cylinder velocity output command 230), and the target tilt cylinder velocity (and the tilt cylinder velocity command 232) that correspond to the vertical velocity input command 206.

Similarly to the discussion of lookup tables 140 and 186, above, a lookup table 246 may further provide, based upon the current tilt orientation of the felling head 22 (as indicated by the signal 214), an output value for a tilt cylinder velocity that may be required to rotate the felling head 22 with a unit tilt velocity when the velocity of the stick pin 26 is zero. This normalized cylinder velocity may then be multiplied 248 by the tilt velocity input command 208 in order to provide a target tilt cylinder velocity (and corresponding tilt velocity output command) that corresponds to the tilt velocity input command 208.

The components of target tilt cylinder velocities (and the corresponding tilt cylinder velocity output commands) that may be derived from the velocity input commands 204, 206 and 208 and the lookup tables 220, 236, and 246 may then be added 250 in order to determine the target tilt cylinder velocity (and the corresponding total tilt velocity output command 232) for the tilt cylinder 30. Similarly, the components of stick cylinder velocity output commands derived from the velocity input commands 204, 206 and 208 and the lookup tables 218 and 236 may be added 252 in order to determine the target stick cylinder velocity (and the corresponding total velocity output command 230) for the stick cylinder 44. Further, the output values for the hoist cylinder velocities derived from the velocity input commands 204, 206 and 208 and the lookup tables 216 and 234 may be added 254 in order to determine the target hoist cylinder velocity (and the corresponding total velocity output command 228) for the hoist cylinder 46. In this way, operator input for movement of the felling head 22 relative to the reference frame of FIG. 6A may be translated into appropriate velocity commands for the various cylinders 30, 44, and 46.

In another implementation, velocity input commands may partly indicate a desired velocity for one or more actuators and may partly indicate a desired velocity for the end effector itself. For example, the controller 52 of the feller buncher 20 may be configured to receive a first velocity input command for the hoist cylinder (e.g., rather than for a vertical velocity of the felling head 22), a second velocity input command for horizontal movement of the felling head 22 (e.g., relative to the reference frame of FIG. 6A), and a third velocity input command for tilt velocity of the felling head 22.

Figure 7:
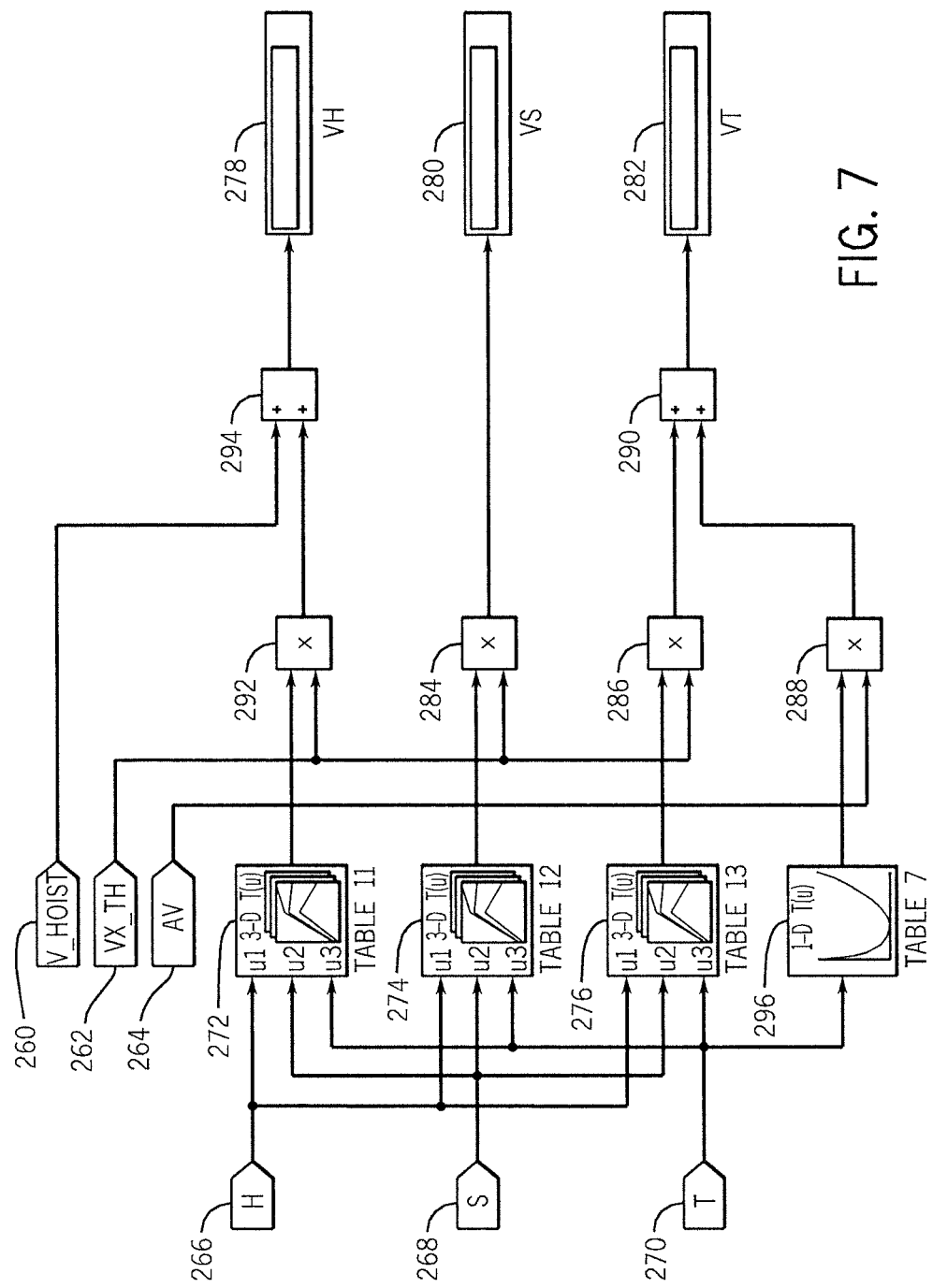
FIG. 7 is a graphical representation of another control scheme for moving the end effector of FIG. 1 in the first kinematic mode, with respect to the second reference frame of FIG. 6A.

Referring also to FIG. 7, in some implementations, velocity input commands 260, 262, and 264 may be received along separate degrees of freedom at the input interface 64 to indicate, respectively, desired hoist cylinder velocity, desired horizontal velocity of the felling head 22 with respect to the reference frame of FIG. 6A, and desired tilt velocity of the felling head 22. Accordingly, the received velocity input commands 260, 262, and 264 may correspond, respectively, to a desired movement of the hoist cylinder 46, a desired movement of the felling head 22 along the cutting plane 36a of the saw disc 36 (or in another direction, for another reference plane), and a desired tilting of the felling head 22. Signals 266, 268, and 270 indicating measured lengths (or other parameters, such as measured velocities) for the hoist cylinder 46, the stick cylinder 44, and the tilt cylinder 30, respectively, may be received from the sensors 62, 60, and 58.

The controller 52 may then process the velocity input commands 260, 262, and 264 and the sensor signals 266, 268, and 270 in order to determine velocity output commands for the cylinders 30, 44, and 46 and thereby provide the desired movement of the felling head 22. For example, lookup tables 272, 274, and 276 may provide, respectively, values for hoist cylinder velocity, stick cylinder velocity, and tilt cylinder velocity that are required to produce a unit horizontal velocity of the felling head 22 (with respect to the reference frame of FIG. 6A) when there are no velocity input commands for the hoist cylinder 46 and no velocity input commands for tilt velocities for the felling head 22. Accordingly, based upon the current orientation of the felling head 22, as indicated by the signals 266, 268 and 270, the output of the tables 272, 274, and 276 may be multiplied by the horizontal velocity input command 262 to indicate components, respectively, of a hoist cylinder velocity output command 278, a stick cylinder velocity output command 280, and a tilt cylinder velocity command 282, that may correspond to the horizontal velocity input command 262. Similarly, the lookup table 296 may provide a value for tilt cylinder velocity that may be required to rotate the felling head 22 with a unit tilt velocity when the horizontal and vertical velocities of the felling head are equal to zero. This normalized tilt cylinder velocity may then be multiplied by the tilt velocity input command 264 in order to provide a further component of tilt cylinder velocity command 282. As depicted, the lookup table 296 accordingly operates as a function of signal 270 for current tilt cylinder orientation.

Still referring to FIG. 7, the controller 52 may multiply 292 the output of the lookup table 272 by the horizontal velocity input command 262, then add 294 the result to the hoist cylinder velocity input command 260 in order to determine the velocity output command 278 for the hoist cylinder 46. Further, the controller 52 may multiply 284 the output of the lookup table 274 by the horizontal velocity input command 262 in order to determine the velocity output command 280 for the stick cylinder 44. The controller 52 may also multiply 286 the output of the lookup table 276 by the horizontal velocity input command 262, multiply 288 the output of the lookup table 296 by the tilt velocity input command 264, and add 290 the results of the multiplications 286 and 288 in order to determine the velocity output command 282 for the tilt cylinder 30.

In another implementation, the controller 52 may be configured to receive velocity input commands relating to a gravitational reference frame, but the target actuator velocities (and corresponding velocity output commands) may be determined with respect to a machine reference frame. Referring to FIG. 8B, for example, velocity input commands 310, 312, and 314 received at the controller 52 (e.g., via the input interface 64) may indicate, respectively, a desired horizontal velocity of the felling head 22 with respect to a horizontal direction 300 (i.e., as determined relative to gravity), a desired vertical velocity of the felling head 22 with respect to a vertical direction 302 (i.e., as determined relative to gravity), and a desired tilt velocity of the felling head 22. These values may then be converted to a reference frame aligned with the nominal orientation of the feller buncher 20 (e.g., with horizontal and vertical axes 304 and 306) before being processed into velocity output commands in various ways (e.g., as described above with regard to FIGS. 3 through 7).

In some implementations, an accelerometer 316 or other sensor (not shown) may be utilized to identify an orientation of the feller buncher 20 with respect to gravity. The velocity input commands 310 and 312 may then be received with respect to the gravitational coordinate system (e.g., along the horizontal direction 300 and the vertical direction 302), and converted to horizontal and vertical velocity commands with respect to the orientation of the feller buncher 20 (e.g., along a horizontal direction 304 and a vertical direction 306) before target velocities (and corresponding velocity output commands) for the various cylinders 30, 44, and 46 are determined. For example, the accelerometer 316 may determine that the feller buncher 20 is oriented at an angle 308 (also, herein, "θ") with respect to the horizontal direction 300 in the gravitational reference frame. As such, horizontal input velocities ("$vx_{gravity}$") with respect to the horizontal direction 300 and vertical input velocities ("$vy_{gravity}$") with respect to the vertical direction 302 may be converted to horizontal input velocities ("$vx_{machine}$") with respect to the horizontal direction 304 and vertical input velocities ("$vy_{machine}$") with respect to the vertical direction 306 as:

$$vx_{machine} = vx_{gravity} \cos\theta + xy_{gravity} \sin\theta,$$

and $$vy_{machine} = -vx_{gravity} \sin\theta + vy_{gravity} \cos\theta.$$

The appropriate velocity commands for the various cylinder 30, 44, and 46 may then be determined in various ways, as described throughout this disclosure (e.g., as outlined with respect to FIGS. 3 through 7).

It will be understood that the various velocity input commands (e.g., the velocity input commands 120, 122, and 124 of FIG. 4) may be provided simultaneously, or may be provided in any order. Further, it will be understood that non-zero velocity input commands may have positive or negative values, such that a negative velocity command results in motion in the direction opposite to the motion produced with a positive velocity command. Further, it will be understood that the input interface 64 may include various devices to receive velocity input commands, including joysticks, knobs, slider controls, or any other device capable of providing a range of signals to the controller 52. Finally, as noted above, the control system may be configured such that the controller 52 provides output velocity commands only when the velocity input commands are non-zero. In this way, for example, if an operator ceases to provide velocity input commands with respect a particular direction of motion, the felling head 22 will be caused to stop moving in that particular direction.

In some implementations, velocity input commands for horizontal movement of an end effector may be provided at an input interface along a first degree of freedom, velocity input commands for vertical movement of an end effector may be provided at an input interface along a second degree of freedom, and velocity input commands for tilting movement of an end effector may be provided at an input interface along a third degree of freedom. Further, in some implementations, the relative amount of movement of an input device included in the input interface (e.g., along a particular degree of freedom) may indicate a relative velocity scale for the desired movement of the end effector.

Figure 9B:
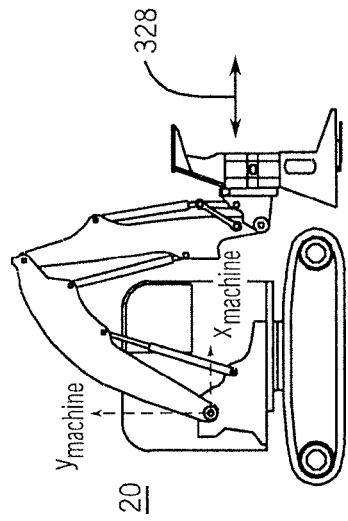
FIGS. 9B through 9D are side schematic views of the feller buncher of FIG. 1 indicating a direction of movement of the felling head corresponding to the velocity input command of FIG. 9A, with respect to the first, second and third reference frames, respectively, of FIGS. 3A, 6A, and 8A.
Figure 9C:
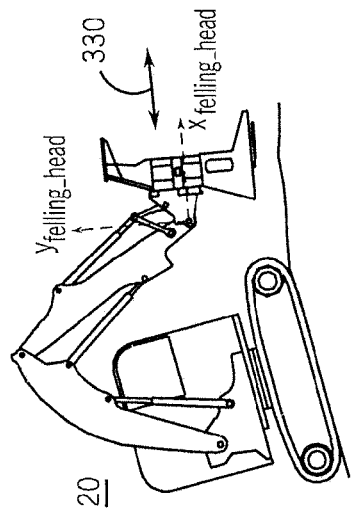
Figure 9A:
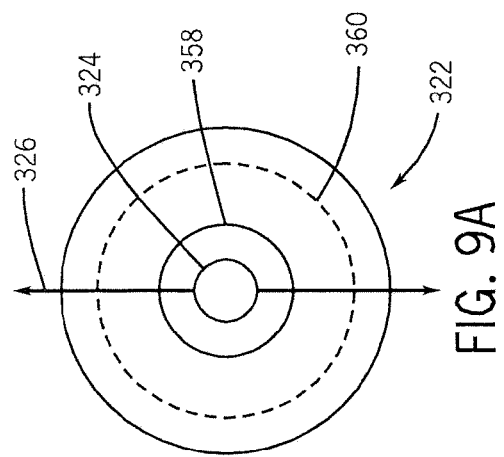
FIG. 9A is a schematic depiction of an input device for the feller buncher of FIG. 1, with a velocity input command being provided along a first degree of freedom.
Figure 9D:
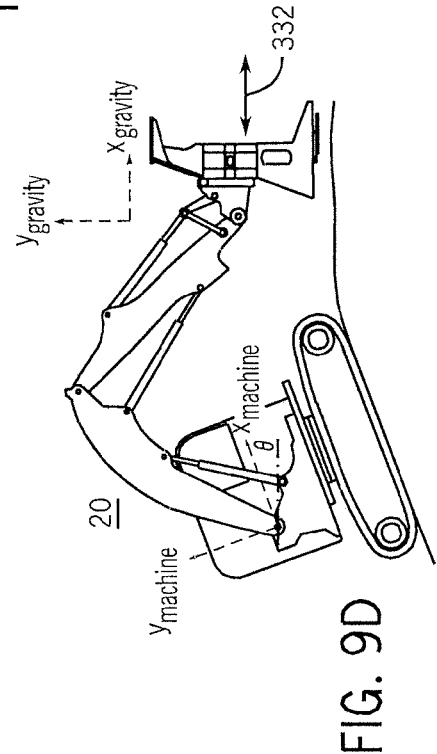

Referring to FIG. 9A, in some implementations, a joystick 322 may be provided as part of the input interface 64. In order to provide velocity input commands for movement of the felling head 22, an operator may engage a control stick 324 of the joystick 322, with various displacements of the control stick 324 corresponding to various velocity input commands. In certain embodiments, the joystick 322 may be configured to receive velocity input commands via movement along two degrees of freedom, with displacement along a first degree of freedom corresponding to horizontal velocity input commands and displacement along a second degree of freedom corresponding to vertical velocity input commands. As depicted in FIG. 9A, for example, an operator may move the control stick 324 along a first degree of freedom 326 (e.g., up or down, as depicted) in order to provide a horizontal velocity input command with respect to a particular frame of reference. (It will be understood that the orientation of the first degree of freedom 326 is presented as an example only.) When provided with respect to a machine reference frame, for example, displacement of the control stick 324 along the degree of freedom 326 may provide a horizontal velocity input command for movement of the felling head 22 along arrow 328 of FIG. 9B. Similarly, when provided with respect to an end effector reference frame, displacement of the control stick 324 along the degree of freedom 326 may provide a horizontal velocity input command for movement of the felling head 22 along arrow 330 of FIG. 9C. Further, when provided with respect to a gravitational reference frame, displacement of the control stick 324 along the degree of freedom 326 may provide a horizontal velocity input command for movement of the felling head 22 along arrow 332 of FIG. 9C.

Figure 10B:
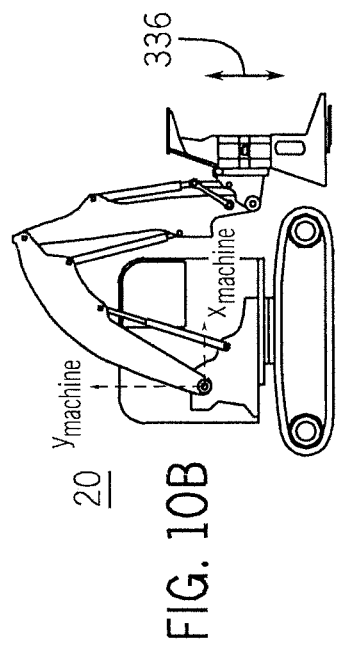
FIGS. 10B through 10D are side schematic views of the feller buncher of FIG. 1 indicating a direction of movement of the felling head corresponding to the velocity input command of FIG. 10A, with respect to the first, second and third reference frames, respectively, of FIGS. 3A, 6A, and 8A.
Figure 10C:
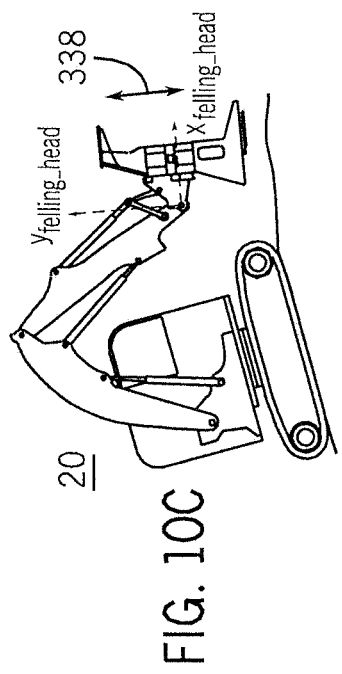
Figure 10A:
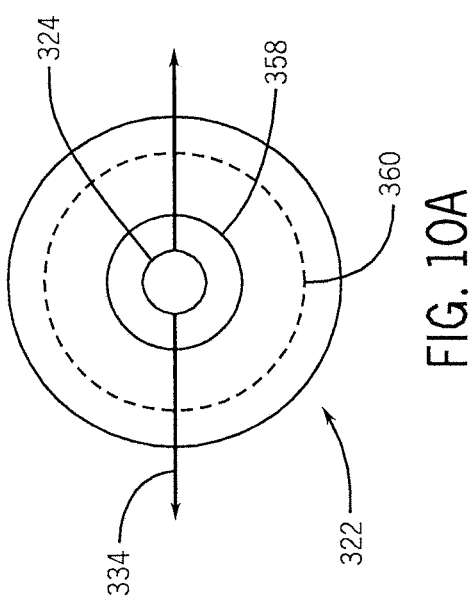
FIG. 10A is a schematic depiction of the input device of FIG. 9A, with a velocity input command being provided along a second degree of freedom.
Figure 10D:
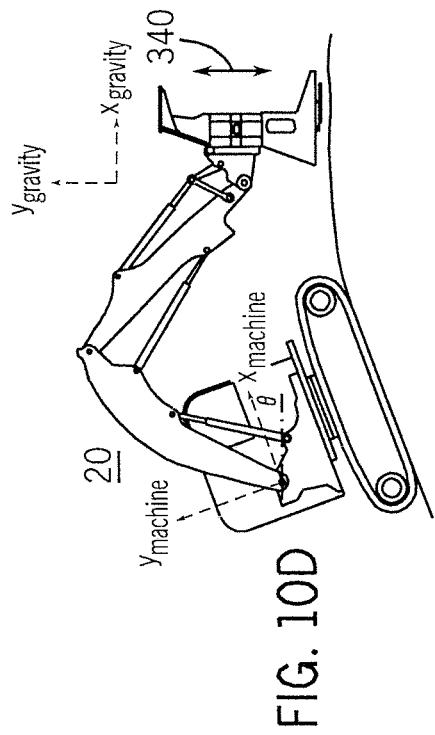

Similarly, referring to FIG. 10A, an operator may move the control stick 324 along a second degree of freedom 334 in order to provide a vertical velocity input command with respect to a particular frame of reference. When provided with respect to a machine reference frame, for example, displacement of the control stick 324 along the degree of freedom 334 (e.g., left or right, as depicted) may provide a vertical velocity input command for movement of the felling head 22 along arrow 336 of FIG. 10B. (It will be understood that the orientation of the second degree of freedom 334 is presented as an example only.) Likewise, when provided with respect to an end effector reference frame, displacement of the control stick 324 along the degree of freedom 334 may provide a vertical velocity input command for movement of the felling head 22 along arrow 338 of FIG. 10O. Further, when provided with respect to a gravitational reference frame, displacement of the control stick 324 along the degree of freedom 334 may provide a vertical velocity input command for movement of the felling head 22 along arrow 340 of FIG. 10C.

Figure 11B:
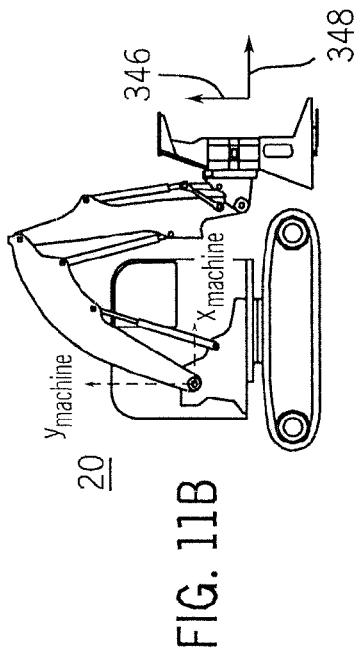
FIGS. 11B through 11D are side schematic views of the feller buncher of FIG. 1 indicating a direction of movement of the felling head corresponding to the velocity input commands of FIG. 11A, with respect to the first, second and third reference frames, respectively, of FIGS. 3A, 6A, and 8A.
Figure 11C:
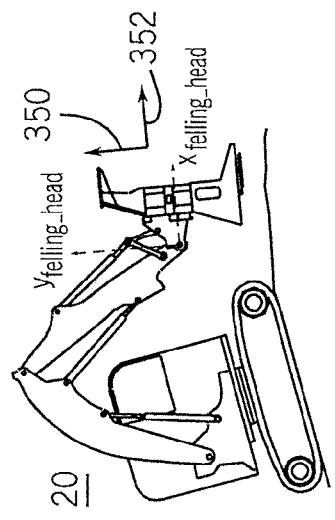
Figure 11A:
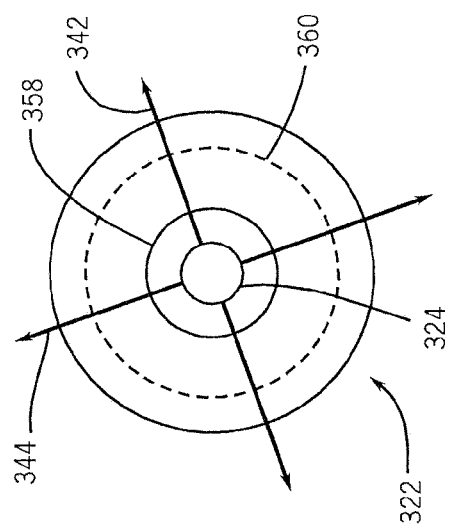
FIG. 11A is a schematic depiction of the input device of FIG. 9A, with velocity input commands being provided along the first and second degrees of freedom.
Figure 11D:
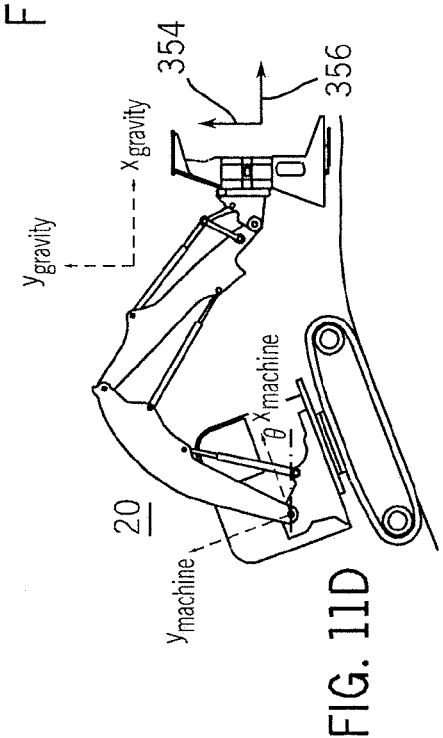

In this light, movements of the control stick 324 that are provided along both degrees of freedom 326 and 334 may correspond to a combination of horizontal and vertical velocity input commands. Referring to FIG. 11A, for example, the control stick 324 may be moved in a variety of directions (e.g., in either direction along arrows 342 and 344), in order to simultaneously provide horizontal and vertical velocity input commands. When provided with respect to a machine reference frame, for example, simultaneous displacement of the control stick 324 along either of the example directions 342 and 344 (i.e., simultaneously along both degrees of freedom 326 and 334) may provide horizontal and vertical velocity input commands for movement of the felling head 22 in the direction of both arrows 346 and 348 of FIG. 11B. Similarly, when provided with respect to an end effector reference frame, displacement of the control stick 324 along either of the directions 342 and 344 may provide combined horizontal and vertical velocity input commands for movement of the felling head 22 in the direction of both arrows 350 and 352 of FIG. 11O. Further, when provided with respect to a gravitational reference frame, displacement of the control stick 324 along either of the directions 342 and 344 may provide horizontal and vertical velocity input commands for movement of the felling head 22 in the direction of both arrows 350 and 352 of FIG. 11D. It will be understood that the orientation of the directions 346 and 344, as well as the orientation of the degrees of freedom 326 and 334, are presented only as examples.

Still referring to FIGS. 9A, 10A and 11A, in some implementations, displacement of the control stick 324 by various amounts may correspond to velocity input commands of various magnitudes. Movement of the control stick 324 to a first inclination (e.g., so as to intersect a first reference line 358), for example, may correspond to a velocity input command that is somewhat smaller in magnitude than a velocity input command corresponding to movement of the control stick 324 to a second inclination (e.g., so as to intersect a second reference line 360). In different implementations, the relative magnitudes corresponding to the different inclinations (e.g., to the different reference lines 358 and 360) may vary proportionally to the degree of inclination of the control stick 324 (or degree of displacement or movement of other input devices), or in various other ways. In some implementations, the speed of movement of an input device may additionally (or alternatively) inform the magnitude of the corresponding velocity input command. For example, a faster movement of the control stick 324 to the first reference line 358 may indicate a velocity input command of greater magnitude than a slower movement of the control stick 324 to the first reference line 358.

It will be understood that the joystick 322 of FIGS. 9A through 11A is presented only as an example input device. In other implementations, other input devices may be utilized, including levers, knobs, switches, dials, and so on. In some implementations, such other input devices may be configured to receive input movements similarly to the joystick 322 (e.g., along multiple degrees of freedom or with varying degrees of movement indicating different velocity magnitudes).

Figure 12B:
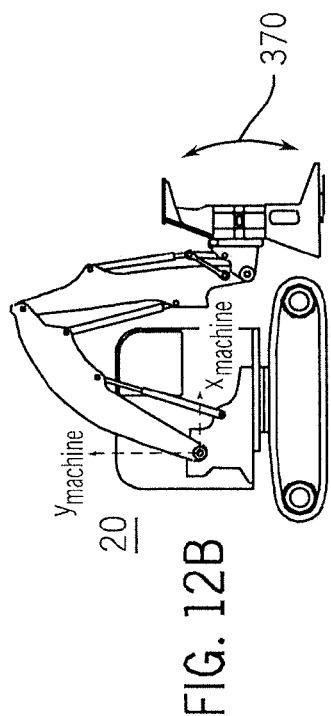
FIGS. 12B through 12D are side schematic views of the feller buncher of FIG. 1 indicating a tilting movement of the felling head corresponding to the velocity input command of FIG. 12A, with respect to the first, second and third reference frames, respectively, of FIGS. 3A, 6A, and 8A.
Figure 12C:
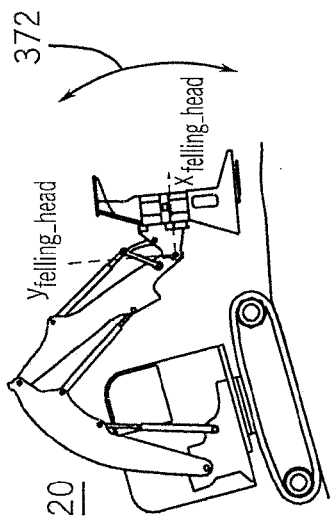
Figure 12A:
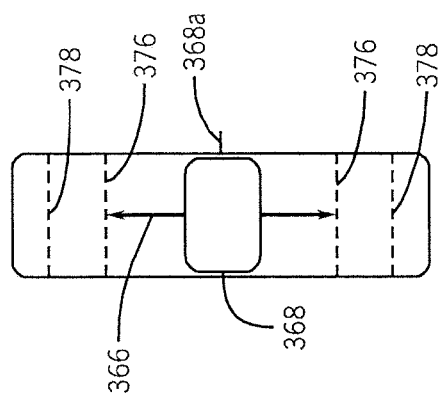
FIG. 12A is a schematic depiction of another input device for the feller buncher of FIG. 1, with a velocity input command being provided along a fourth degree of freedom.
Figure 12D:
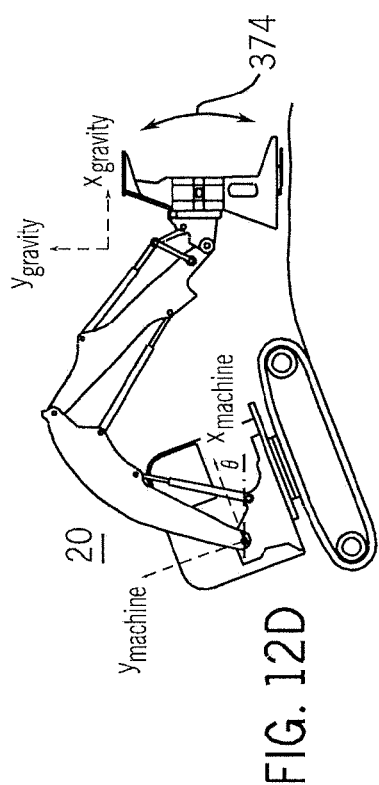

Referring also to FIG. 12A, in some implementations, an input device of the input interface 64 may alternatively (or additionally) be configured as an input lever 368 with a single degree of freedom. As with the control stick 324, movement of the lever 368 along the degree of freedom may correspond to a velocity input command of a particular type. As depicted, for example, movement of the lever 368 along the degree of freedom 366 may correspond to velocity input commands for tilting movement of the felling head 22. Accordingly, as a result of a particular displacement of the lever 368, the felling head may provide velocity input commands for movement of the felling head 22 in the direction of arrows 370, 372, and 374 of FIGS. 12B, 12C and 12D, respectively. In some implementations, displacement of the lever 368 to different degrees (e.g., to different reference lines 376 and 378 of FIG. 12A) or at different rates may correspond to tilt velocity input commands of different magnitudes.

As depicted, the reference lines 376 and 378 are oriented symmetrically to either side of a home position 368a of the lever 368, such that equal displacements of the lever 368 in either direction from the home position may correspond to velocity input commands of equal magnitudes, but opposite direction. Referring again to FIGS. 9A through 11A, the joystick 322 may be similarly configured, such that equal displacement of the control stick 324 in opposite directions may correspond to velocity input commands of equal magnitudes, but opposite direction. In other embodiments, including with respect to the lever 368, the joystick 322 or other input devices, other arrangements may be possible. For example, displacement of the lever 368 (or other device) to a certain degree in one direction may indicate a velocity input command of greater magnitude than displacement of the lever 368 (or other device) to the same degree but in a different direction. This may be useful, for example, to provide for generally faster forward and upward movement of an end effector, but generally slower rearward and downward movement.

Figure 13A:
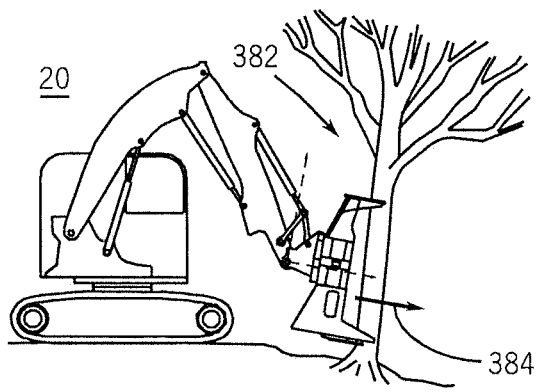
FIG. 13A is a side schematic view of the feller buncher of FIG. 1 depicting a movement of the felling head under a second kinematic mode.

In some implementations, as also discussed above, a second kinematic mode may be possible, in which a particular tilt orientation of the felling head 22 may be maintained throughout a commanded motion. This may be useful, for example, in order to execute a cutting operation for a tree in which the cutting disc 36 is maintained at a particular tilt orientation and is moved in parallel with the particular tilt orientation (e.g., along a particular cutting plane). Referring to FIG. 13A, for example, an operator may desire to cut a slanted tree 382 with the felling head 22. Under conventional systems, the operator may be required to carefully and manually control the movement of the felling head 22 such that the saw disc 36 (see FIG. 1) is moved along the cutting plane 36a (see FIG. 1) during the cut. In contrast, under the second kinematic mode, the controller 52 may automatically move the felling head 22 along a direction 384 aligned with the cutting plane 36a, such that the tree 382 may be cut without elevated risk of the saw disc 36 binding.

An operator may provide various velocity input commands with respect to the second kinematic mode. In some implementations, for example, an operator may provide a target tilt orientation and the controller 52 may determine and implement commands to move the felling head 22 along a cutting plane defined by the target tilt orientation, while simultaneously maintaining the target tilt orientation for the felling head 22. Accordingly, for example, velocity commands for the various cylinders 30, 44, and 46 may be determined in a similar manner to that discussed above regarding the first kinematic mode (see, e.g., discussion of FIGS. 3 through 7). Additional constraints may be applied, however, in order to ensure that the target tilt orientation is maintained. For example, the various velocity input commands for horizontal and vertical velocity may be automatically determined based upon the target tilt orientation and a target aggregate translational velocity (e.g., a default cutting velocity, a target translational velocity provided by the operator, or another target velocity), or tilt velocity output commands may be automatically determined based upon the target tilt orientation or the target aggregate translational velocity (e.g., rather than based upon active tilt velocity input commands from an operator).

Operation in the second kinematic mode may be initiated based on various inputs. In some implementations, for example, sensors on the felling head (or elsewhere) may detect a proximity of a tree to be cut (or other parameters) and velocity commands for the felling head 22 may be determined accordingly. As another example, operation in the second kinematic mode may be triggered based upon a particular operation or sequence of operations. In some implementations, for example, a particular movement or series of movements of the boom assembly 38 or the feller buncher 20 may be determined to generally precede a cutting operation, such that the execution of the particular movement or series of movements may automatically initiate the second kinematic mode.

As noted above, the second kinematic mode may be implemented based on various considerations. A number of considerations, however, may be the same for various different implementations. For example, the translational trajectory for the felling head 22 (e.g., as measured at the stick pin 26) may generally be established before the full set of velocity commands for the cylinders 30, 44, and 46 may be determined. The controller 52 may then determine the velocity commands for the cylinders 30, 44, and 46 such that zero tilt velocity is maintained for the felling head 22 and the saw disc 36 remains in a single plane during the felling head movement.

In some implementations of the second kinematic mode, an operator may provide a target aggregate translational velocity for the felling head 22 (e.g., target horizontal and vertical velocity input commands, with respect to a particular reference frame), and the controller 52 may determine and implement commands to move the felling head 22 along a target velocity direction corresponding to the aggregate translational velocity, while also maintaining a parallel tilt orientation of the felling head 22. In such a case, velocity commands for the various cylinder 30, 44, and 46 may, for example, be determined similarly to the discussion above regarding the first kinematic mode. The tilt velocity input commands, however, may be determined based upon the target aggregate translational velocity (e.g., determined as the angle corresponding to the orientation of a vector sum of the horizontal and vertical velocity input commands, with respect to the relevant reference frame).

In some implementations, the operator may provide velocity input commands for the translational velocity of the felling head 22 as a fixed or varying command after the second kinematic mode is initiated. For example, the operator may provide velocity input commands for particular horizontal and vertical velocities of the felling head 22 (with respect to a particular reference frame) or may provide a velocity input command corresponding to a magnitude of the desired aggregate translational velocity. In the latter case, the operator may also provide a velocity input command indicating the direction of the aggregate translational movement, or the controller 52 may automatically determine an appropriate direction based upon a specified (or determined) tilt orientation of the felling head 22.

In some implementations, the operator may provide velocity input commands continually through the execution of the second kinematic mode, such that the operator continually controls the velocity magnitude of the cut. The controller 52 may then provide command velocities to the various cylinders 30, 44, and 46 only while the operator is providing a command for the stick pin velocity magnitude. In some implementations, the operator may provide such input commands only at the start of the second kinematic mode (or at another discrete time), such that the operator specifies an initial (or other) velocity magnitude (and, in some implementations, velocity direction) that is maintained over time.

Figure 13B:
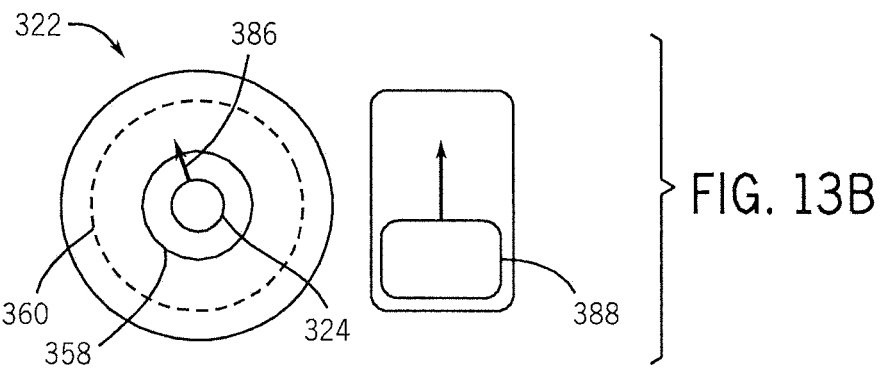
FIG. 13B is a schematic depiction of two input devices for the feller buncher of FIG. 1, which may be used for the second kinematic mode.

Referring to FIG. 13B, for example, the joystick 322 may sometimes be used in the second kinematic mode to provide velocity input commands for a particular horizontal and vertical velocities of the felling head 22 (with respect to a particular reference frame). For example, moving the control stick 324 in the direction 386 to the reference line 360 may indicate a desired translational velocity of a particular direction and magnitude. Based upon initiation of the second kinematic mode via a mode switch 388, the controller 52 may determine a target tilt orientation (e.g., a tilt orientation corresponding to the indicated translational direction) and move the felling head 22 along the indicated direction, with the indicated velocity magnitude, while maintaining the target tilt orientation.

In some implementations, the mode switch 388 may be utilized to control operation in other modes. For example, sliding the mode switch 388 to a first setting may implement the joint mode, sliding the mode switch 388 to a second setting may implement the first kinematic mode, and sliding the mode switch 388 to a third setting may implement the second kinematic mode. In some embodiments, the mode switch 388 may be biased (e.g., spring-loaded), such that the mode switch 388 tends to return to a default position. Such a configuration may, for example, ensure that the control system operates in a particular mode (e.g., the first kinematic mode) as a default. In some embodiments, the mode switch 388 may be mounted (e.g., as a thumb switch) to other input devices, such as the tilt lever 368 (see FIG. 12A).

As another example of operations under the second kinematic mode, moving the control stick 324 in the direction 386 may indicate a desired translational direction, but not a desired translational velocity magnitude. Rather, the translational velocity magnitude may be determined based upon other considerations, such as other operator input, a default velocity magnitude (e.g., for a particular tree, machine, operator, and so on), a current system capability (e.g., a current free capacity of the pumps 48), and so on. In such a case, the operator may separately indicate a target tilt orientation, or the controller 52 may automatically determine the target tilt orientation (e.g., a tilt orientation corresponding to the translational direction). The felling head 22 may then be moved along the direction indicated by the operator-provided velocity input command, with the determined velocity magnitude, while maintaining the target tilt orientation.

As also noted above, in some implementations, the operator may be required to provide velocity input commands continually through the execution of the second kinematic mode. For example, the magnitude or the direction of a felling head movement in the second kinematic mode may be continually controlled via input received at the joystick 322. Contrastingly, in some implementations, the operator may provide velocity input commands only at the start of the second kinematic mode. For example, the magnitude or direction of a felling head movement in the second kinematic mode may be provided via an initial input received at the joystick 322, but the operator may thereafter release the joystick 322 without necessarily stopping the movement of the felling head 22.

In some implementations, the second kinematic mode may be initiated only based upon an active input. For example, the second kinematic mode may sometimes operate only while an operator actively holds or depresses the mode switch 388. In some implementations, in contrast, the second kinematic mode may be initiated based upon a discrete initiation command, without the need for continual operator input (at least with respect to some input devices). For example, the second kinematic mode may be initiated when an operator presses the mode switch 388, regardless of whether the mode switch 388 is thereafter released. In such a case, a different action (or a repeat of the same action) may then cause the second kinematic mode to end. For example, a second press of the mode switch 388 or a movement of the switch 388 in a different direction may result in the end of the second kinematic mode. In some implementations, the second kinematic mode may terminate automatically. For example, the second kinematic mode may terminate automatically after a predetermined (or operator-provided) time, upon detection of the end of an operation (e.g., the end of a cutting operation for a standing tree), or based upon various other parameters.

In some implementations of the second kinematic mode, target actuator velocities (and corresponding velocity output commands) may be determined based upon a fixed-magnitude target translational velocity and a duration of an operation. For a cutting operation, for example, a target magnitude for translational velocity and a target duration of the cutting operation may be determined in various ways. The target actuator velocities may then be determined such that the felling head moves with the target velocity magnitude for the target duration.

In this regard, a target orientation of the felling head, a target direction of the translational movement, and a target velocity magnitude may be determined in a variety of ways. In some implementations, for example, an operator may provide a start-of-motion command (e.g., via actuation of the switch 388, or other device of the input interface 64), which may initiate motion of the stick pin 26 along a target trajectory. In some implementations, the operator may actively indicate the target trajectory (e.g., via the control stick 324). In some implementations, the controller 52 may automatically determine the target trajectory based upon factors such as a current orientation of the disc saw 36, a detected (or input) orientation of a tree to be cut, and so on.

Figure 13C:
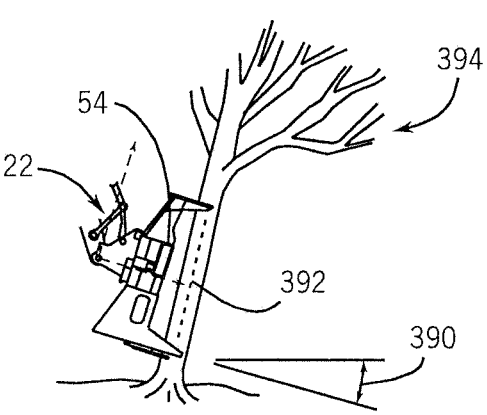
FIGS. 13C and 13D are side schematic views of the felling head of FIG. 1 during cutting operations under the second kinematic mode.

As depicted in FIG. 13C, for example, at the start of a cutting operation an operator (or the controller 52) may align the felling head 22 at an angle 390 (i.e., with a particular tilt orientation) with respect to true horizontal (e.g., as measured with respect to gravity). Such alignment may correspond, for example, to the cutting plane 36a (see FIG. 1) being aligned generally perpendicularly to a major axis 392 of a tree 394. Based upon this initial orientation of the felling head 22, a target tilt orientation for the felling head 22 for operation in the second kinematic mode may be determined to be equal to the angle 390. An operator (or the controller 52) may align the felling head 22 with the appropriate angle 390 based on various factors including visual inspection of the tree 394, signals from sensors for detecting aspects of the tree (e.g., one of the sensors 54), and so on.

Figure 13D:
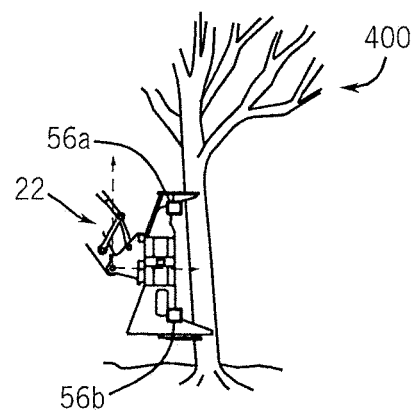

In certain implementations, one or more sensors may be utilized to identify the start of an operation with an end effector, and the second kinematic mode may be initiated based upon the sensor signals, or may be implemented for a particular time interval (or with respect to other parameters) that may be determined based upon the sensor signals. For example, referring to FIG. 13D, one or both of sensors 56a and 56b may detect a proximity of a tree 400 and the controller 52 may initiate a cut of the tree 400 under the second kinematic mode based upon the detected proximity. In some implementations, the sensors 56a and 56b (or others) may alternatively (or additionally) detect an orientation of the tree 400, as may be useful to identify a target tilt orientation for the felling head 22, or various other parameters.

In some implementations, the sensor 56b (or another sensor) may be configured to detect that actual start of a cut with the saw disc 36 (see FIG. 1). For example, the sensor 56b may alternatively (or additionally) be configured as a pressure or speed sensor for the saw disc 36 (or associated components), such that the sensor 56b may detect when the saw disc 36 has begun to cut the tree 400. As such, upon the sensor 56b detecting an indicator such as a sudden decrease in saw speed or a sudden decrease in saw motor pressure (e.g., for a hydraulically operated saw), the controller 52 may determine that the saw disc 36 has actually begun to cut the tree 400. Accordingly, the controller 52 may initiate the second kinematic mode (e.g., with a target tilt orientation corresponding to the current orientation of the cutting plane 36a) or may start a timer for a target duration of the second kinematic mode.

In some implementations, the controller 52 may control movement of the felling head 22 in the second kinematic mode based upon parameters that may generally describe the trees that are currently being harvested. Such parameters may include, for example, a characteristic (e.g., average) or actual tree diameter or tree hardness, tree species information, and so on. The parameters may be provided by an operator (e.g., via the input interface 64), stored in a memory associated with the controller 52, or detected automatically by various sensors. In some implementations, the controller 52 may be configured to optimize the rate of felling head advancement for particular types of wood and to optimize the cutting duration for particular tree sizes. For example, for a tree (or tree type) of a known (or characteristic) diameter, the controller 52 may implement a cutting operation under the second kinematic mode with an appropriate translational velocity for the type of tree to be cut, and for the shortest practical time interval that may allow a full cut of the tree to be made.

In some implementations, a translational velocity profile for the felling head 22 (or another end effector), including factors such as velocity magnitude, velocity direction, and movement duration, may be determined based upon a duty cycle identified by the controller 52. Generally, a duty cycle may include a plurality of sequential movements of the felling head 22, which may exhibit various different velocity directions, velocity magnitudes, and movement durations.

In some implementations, a duty cycle may be recorded in (and identified by the controller 52 from) a series of lines of code (or parameters) that may represent steps for the controller 52 to address sequentially. Each line, for example, may include a time duration value, a translational (or other) velocity magnitude, and a velocity direction index with a value equal to either +1 or −1. In some implementations, each line may also include a target trajectory angle corresponding to a target translational direction. In some implementations, a target trajectory angle may be identified in from other sources (e.g., in the various ways described above).

For each line of the duty cycle, the controller 52 may calculate the required horizontal velocity of the felling head 22 by multiplying the translational velocity magnitude by the product of the direction index and the cosine of the target trajectory angle (or sine, depending on the relevant reference frame). The controller 52 may further calculate the required vertical velocity of the of the felling head 22, for each line of the duty cycle, by multiplying the translational velocity magnitude by the product of the direction index and the sine of the target trajectory angle (or cosine, depending on the relevant reference frame). The controller 52 may then determine target actuator velocities (and corresponding velocity output commands) for each line of the duty cycle and execute the duty cycle by implementing the commands sequentially and with the corresponding time duration value.

In this regard, the use of a direction index in the lines of a duty cycle may provide a convenient method for implementing reversed movement of an end effector, with respect to a previous movement. For example, in programming a duty cycle for a saw cut into a tree, an operator may use the same target trajectory angle (or other corresponding parameter), but opposite direction indices, for a cut into the tree and for a subsequent retraction of the saw out of the tree.

Figure 14A:
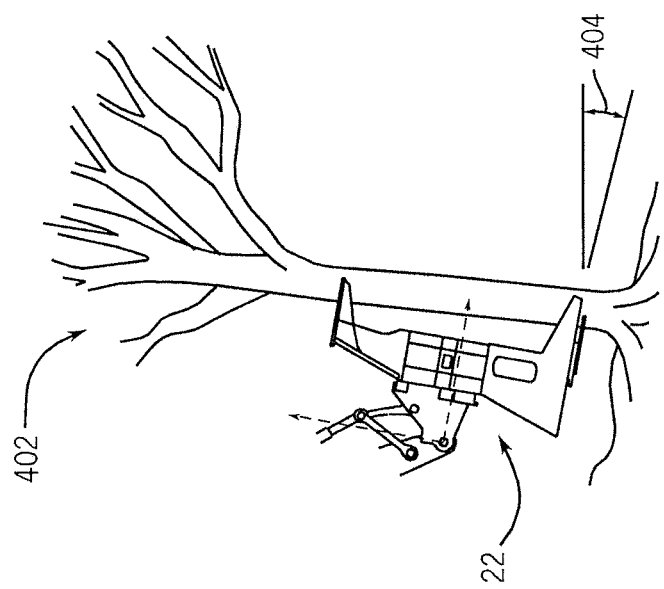
FIG. 14A is a side schematic view of the felling head of FIG. 1 during a cutting operation using a duty cycle.
Figure 14B:
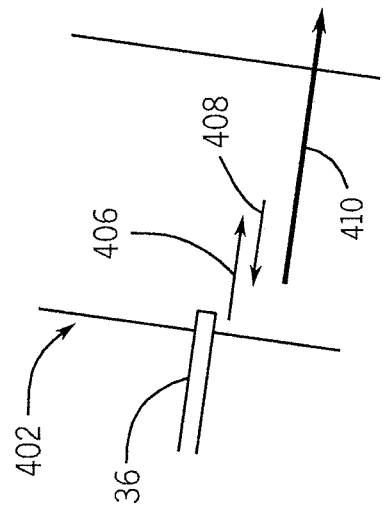
FIG. 14B is a side schematic view of movements of a disc saw of the felling head under the duty cycle of FIG. 14A.

For a cutting operation for a tree 402, as depicted in FIG. 14A, an example duty cycle for the feller buncher 20 may include a target trajectory angle 404 that has been set to 20 degrees. Referring also to FIG. 14B, the duty cycle may include, with the target trajectory angle 404, a first cut 406 into the tree 402 lasting one second, with a translational velocity magnitude of 0.2 m/s, followed by a removal 408 of the saw disc 36 from the tree lasting for 0.5 seconds, with a translational velocity magnitude of 0.2 m/s. A second cut 410 into the same tree 402 may then be executed, lasting 1.5 seconds, with translational velocity magnitude of 0.4 m/s. In this way, with target actuator velocities having been determined, for example, under the second kinematic mode, a three-step cutting operation for the tree 402 may be implemented automatically by the controller 52. It will be understood that other speeds, durations, and target trajectory angles may be used. Likewise, in some implementations, different numbers, orders, or directions of cuts and removals (or other operations) may be used.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A control system for moving an end effector of a work machine, the work machine including a boom assembly with a hoist boom pivotally connected to a machine frame and movable relative to the machine frame by a hoist actuator, a stick boom pivotally connected to the hoist boom and movable relative to the hoist boom by a stick actuator, and the end effector pivotally connected to the stick boom at a stick pin and movable relative to the stick boom by a tilt actuator, the control system comprising:

a plurality of sensors configured to sense one or more indicators of a current orientation of the hoist boom, a current orientation of the stick boom, and a current orientation of the end effector;

an input interface configured to receive velocity input commands from an operator for movements of the end effector; and a controller configured to:

receive, via the input interface, signals corresponding to at least one of the velocity input command for a desired movement of the end effector;

determine, based upon the at least one velocity input command and the one or more indicators from the plurality of sensors, at least one target actuator velocity for actuating one or more of the hoist actuator, the stick actuator, and the tilt actuator; and command one or more of the hoist actuator, the stick actuator, and the tilt actuator to move with the determined at least one target actuator velocity, such that the end effector moves with an aggregate velocity corresponding to the desired movement.

2. The control system of claim 1, wherein one or more of the hoist actuator, the stick actuator and the tilt actuator is configured as a linear actuator; and wherein the plurality of sensors includes one or more of a first sensor to detect a current length of the hoist actuator, a second sensor to detect a current length of the stick actuator, and a third sensor to detect a current length of the tilt actuator.

3. The control system of claim 1, wherein the input interface is configured to receive a stick pin horizontal velocity input command, a stick pin vertical velocity input command, and an end effector tilt velocity input command; and wherein the controller is configured to determine the at least one target actuator velocity such that the commanded movement of the one or more of the hoist actuator, the stick actuator, and the tile actuator moves the end effector with a horizontal velocity corresponding to the horizontal velocity input command and a vertical velocity corresponding to the vertical velocity input command, and tilts the end effector with a tilt velocity corresponding to the tilt velocity input command.

4. The control system of claim 3, wherein the input interface is configured to receive one or more of the stick pin horizontal velocity input command, the stick pin vertical velocity input command, and the end effector tilt velocity input command with respect to a reference frame that includes one of:

a machine reference frame with horizontal and vertical movement directions defined based on a operational orientation of the machine frame;

an end effector reference frame with horizontal and vertical movement directions defined based on a current orientation of the end effector; and a gravitational reference frame having horizontal and vertical movement directions defined based on a direction of gravity.

5. The control system of claim 3, wherein the controller is further configured to:

determine that one or more of the stick pin horizontal velocity input command, the stick pin vertical velocity command, and the end effector tilt velocity input command corresponds to a commanded movement of the one or more of the hoist actuator, the stick actuator and the tilt actuator with a velocity that exceeds a current capability of the work machine; and determine the at least one target actuator velocity such that commanding the one or more of the hoist actuator, the stick actuator, and the tilt actuator to move causes the end effector to move with a reduced velocity relative to one or more of the stick pin horizontal velocity input command, the stick pin vertical velocity input command, and the end effector tilt velocity input command.

6. The control system of claim 5, wherein the at least one velocity input command corresponds to a target direction of movement of the end effector; and wherein component velocities of the at least one target actuator velocity are reduced proportionally to each other, such that the end effector moves in the target direction when the one or more of the hoist actuator, the stick actuator, and the tilt actuator are commanded to move with the at least one target actuator velocity.

7. The control system of claim 1, wherein the controller is configured to operate the work machine in one or more of a joint mode, a first kinematic mode, and a second kinematic mode;

wherein, in the joint mode:

the input interface is configured to receive a first velocity input command indicating a desired velocity of only the hoist actuator, a second velocity input command indicating a desired velocity of only the stick actuator, and a third velocity input command indicating a desired velocity of only the tilt actuator; and the at least one velocity input command includes:

a joint-mode target velocity for the hoist actuator, determined based upon first velocity input command;

a joint-mode target velocity for the stick actuator, determined based upon the second velocity input command; and a joint-mode target velocity for the tilt actuator, determined based upon the third velocity input command;

wherein commanding the one or more of the hoist actuator, stick actuator and tilt actuator to move with the at least one target actuator velocity causes each of the one or more of the hoist actuator, the stick actuator and the tilt actuator to move with the corresponding desired velocity;

wherein, in the first kinematic mode:

the input interface is configured to receive a fourth velocity input command indicating a desired horizontal velocity of the end effector relative to a first reference frame, a fifth velocity input command indicating a desired vertical velocity of the end effector relative to the first reference frame, and a sixth velocity input command indicating a desired tilt velocity of the end effector; and the at least one velocity input command includes:

a first-mode target velocity for the hoist actuator, determined based upon two or more of the fourth, fifth, and sixth velocity input commands;

a first-mode target velocity for the stick actuator, determined based upon two or more of the fourth, fifth, and sixth velocity input commands;

a first-mode target velocity for the tilt actuator, determined based upon two or more of the fourth, fifth, and sixth velocity input commands;

wherein commanding the one or more of the hoist actuator, the stick actuator and the tilt actuator to move with the at least one target actuator velocity causes the end effector to move horizontally based upon the fourth velocity input and vertically based upon the fifth velocity input, each relative to the first reference frame, and causes the end effector to tilt based upon the sixth velocity input; and wherein, in the second kinematic mode:

the controller is further configured to determine the at least one target actuator velocity based upon a target tilt orientation for the end effector;

wherein commanding the one or more of the hoist actuator, the stick actuator and the tilt actuator to move with the at least one target actuator velocity causes the end effector to move along a target trajectory while maintaining the target tilt orientation.

8. The control system of claim 7, wherein the controller is configured to initiate the second kinematic mode automatically based upon one or more of a signal from a proximity sensor for the end effector, an occurrence of a triggering sequence of operations of the work machine, and an operator input at the input interface.

9. The control system of claim 7, wherein, in the second kinematic mode, the at least one velocity input command includes one or more of:

seventh and eighth velocity input commands indicating, respectively, a desired horizontal velocity of the end effector relative to a second reference frame and a desired vertical velocity of the end effector relative to the second reference frame;

an initiation command for moving the end effector with a target velocity in the second kinematic mode; and a velocity magnitude command for movement along the target trajectory.

10. The control system of claim 1, wherein the controller is further configured to:

identify a predetermined duty cycle for the end effector, the duty cycle including a plurality of sequential movements of the end effector; and determine the at least one velocity input command to include, based on the plurality of sequential movements of the duty cycle, duty-cycle target velocities for one or more of the hoist actuator, the stick actuator and the tilt actuator; and wherein commanding the one or more of the hoist actuator, the stick actuator and the tilt actuator to move with the at least one velocity input command causes the end effector to execute the plurality of sequential movements.

11. A control system for moving an end effector of a work machine, the work machine including a boom assembly connected to at a first end to a machine frame and connected at a second end to the end effector, the boom assembly including at least first and second booms separately movable, respectively, by first and second boom actuators, the control system comprising:

an input interface configured to receive velocity input commands from an operator for movements of the end effector, the input interface being configured to receive the velocity input commands with at least first and second degrees of freedom, wherein, in a first kinematic mode of operation, a first velocity input command received at the input interface along the first degree of freedom indicates a desired horizontal velocity of the end effector relative to a reference frame, and a second velocity input command received at the input interface along the second degree of freedom indicates a desired vertical velocity of the end effector relative to the reference frame; and a controller configured to:
receive, via the input interface, signals corresponding to at least one of the velocity input command for a desired movement of the end effector;
determine, based upon the at least one velocity input command and a current orientation of the boom assembly, at least one target actuator velocity for actuating one or more of the first and second boom actuators; and
command one or more of the first and second boom actuators to move with the determined at least one target actuator velocity, such that the end effector moves with an aggregate velocity corresponding to the desired movement.

12. The control system of claim 11, wherein the end effector is pivotally connected to the boom assembly and movable relative to at least one of the first and second booms by a tilt actuator;

wherein the input interface is further configured to receive the velocity input commands with a third degree of freedom, a third velocity input command received at the input interface along the third degree of freedom indicating, in the first kinematic mode, a desired tilt velocity of the end effector; and wherein the controller is further configured to:
determine the at least one target actuator velocity for actuating one or more of the first boom actuator, the second boom actuator, and the tilt actuator; and
command one or more of the first boom actuator, the second actuator, and the tilt actuator to move with the determined at least one target actuator velocity.

13. The control system of claim 12, wherein the input interface includes a mode selection device for selecting one of the first kinematic mode and a joint mode of operation; and wherein, in the joint mode of operation:
the input interface is configured to receive a fourth velocity input command indicating a desired velocity of only the first boom actuator, a fifth velocity input command indicating a desired velocity of only the second boom actuator, and a sixth velocity input command indicating a desired velocity of only the tilt actuator; and
the at least one velocity input command includes:
a joint-mode target velocity for the first boom actuator, determined based upon fourth velocity input command;
a joint-mode target velocity for the second boom actuator, determined based upon the fifth velocity input command; and
a joint-mode target velocity for the tilt actuator, determined based upon the sixth velocity input command.

14. The control system of claim 12, wherein, in a second kinematic mode the controller is further configured to:
determine a target tilt orientation for the end effector; and
determine the at least one target actuator velocity based upon one or more of a desired movement of the end effector and the target tilt orientation;
wherein commanding the one or more of the first boom actuator, the second boom actuator, and the tilt actuator to move with the at least one target actuator velocity causes the end effector to maintain the target tilt orientation as the end effector moves with the aggregate velocity.

15. The control system of claim 14, wherein the controller is configured to initiate the second kinematic mode automatically based upon one or more of a signal from a proximity sensor for the end effector, an occurrence of a triggering sequence of operations for the work machine, and an input at the input interface.

16. The control system of claim 14, wherein the end effector includes a cutting disc and the target tilt orientation corresponds to a constant angular orientation of the cutting disc with respect to the reference frame.

17. The control system of claim 12, wherein the controller is further configured to:
identify a predetermined duty cycle for the end effector, the duty cycle including a plurality of sequential movements of the end effector; and
determine the at least one velocity input command to include, based on the plurality of sequential movements of the duty cycle, duty-cycle target velocities for one or more of the first boom actuator, the second boom actuator and the tilt actuator;
wherein commanding the one or more of the first boom actuator, the second boom actuator and the tilt actuator to move with the at least one velocity input command causes the end effector to execute the plurality of sequential movements.

18. The control system of claim 12, wherein one or more of the first boom actuator, the second boom actuator and the tilt actuator is configured as a linear actuator; and
wherein the current orientation of the boom assembly is determined based upon signals from a plurality of sensors including one or more of a first sensor to detect a current length of the first boom actuator, a second sensor to detect a current length of the second boom actuator, and a third sensor to detect a current length of the tilt actuator.

19. The control system of claim 11, wherein the reference frame includes an end effector reference frame having horizontal and vertical movement directions defined based on a current orientation of the end effector.

20. A feller buncher comprising:
a machine frame;
a hoist boom pivotally connected to the machine frame and pivotally movable relative to the machine frame by a hydraulic hoist cylinder;
a stick boom pivotally connected to the hoist boom and pivotally movable relative to the hoist boom by a hydraulic stick cylinder;
a felling head pivotally connected to the stick boom via a wrist assembly with a stick pin and pivotally movable relative to the stick boom by a hydraulic tilt cylinder, the felling head including a saw disc defining a cutting plane;

a plurality of sensors configured to sense indicators of a current length of each of the hoist cylinder, the stick cylinder, and the tilt cylinder;

an input interface configured to receive velocity input commands from an operator for movements of the felling head, the input interface being configured to receive the velocity input commands with at least first, second and third degrees of freedom; and a controller configured to:
  receive, via the input interface, signals corresponding to at least one of the velocity input commands for the movement of the felling head;
  determine, based upon the at least one velocity input command and the sensed indicators, at least one target actuator velocity for actuating one or more of the hoist cylinder, the stick cylinder, and the tilt cylinder; and
  command one or more of the hoist cylinder, the stick cylinder, and the tilt cylinder to move with the determined at least one target actuator velocity, such that the felling head moves with an aggregate velocity corresponding to the desired movement;

wherein, in a first kinematic mode of operation:
  a first velocity input commands received at the input interface along the first degree of freedom indicates a desired horizontal velocity of the stick pin relative to a reference frame;
  a second velocity input command received at the input interface along the second degree of freedom indicates a desired vertical velocity of the stick pin relative to the reference frame; and
  a third velocity input command received at the input interface along the third degree of freedom indicates a desired tilt velocity for tilting movement of the felling head; and wherein, in a second kinematic mode of operation, the at least one target actuator velocity is determined such that commanding the one or more of the hoist cylinder, the stick cylinder and the tile cylinder to move with the at least one target actuator velocity causes the saw disc to move along the cutting plane.

* * * * *